Feb. 28, 1956  E. P. WIGNER ET AL  2,736,696
REACTOR
Filed Aug. 29, 1945  13 Sheets-Sheet 1
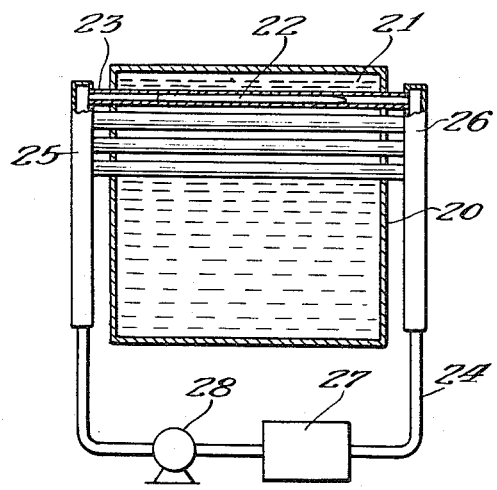
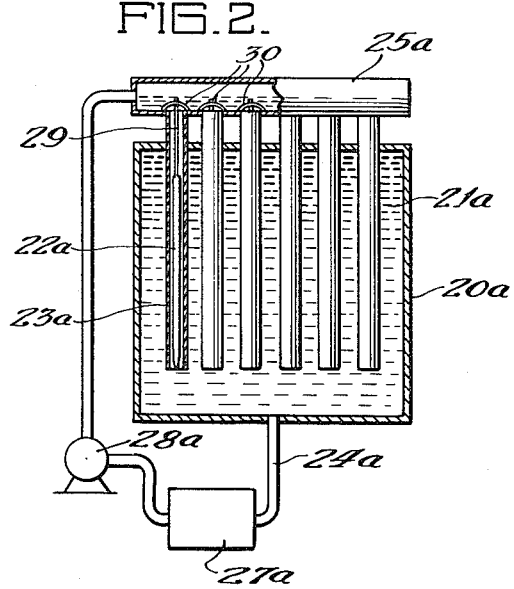
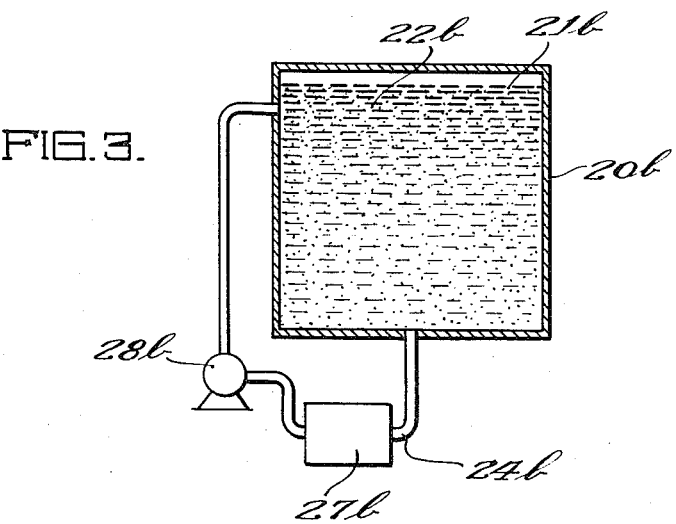
Witnesses:
Herbert E. Metcalf
Francis W. Test
Inventors:
Eugene P. Wigner
Leo A. Ohlinger
Gale J. Young
Alvin M. Weinberg
By: Robert A. Lounsder
Attorney

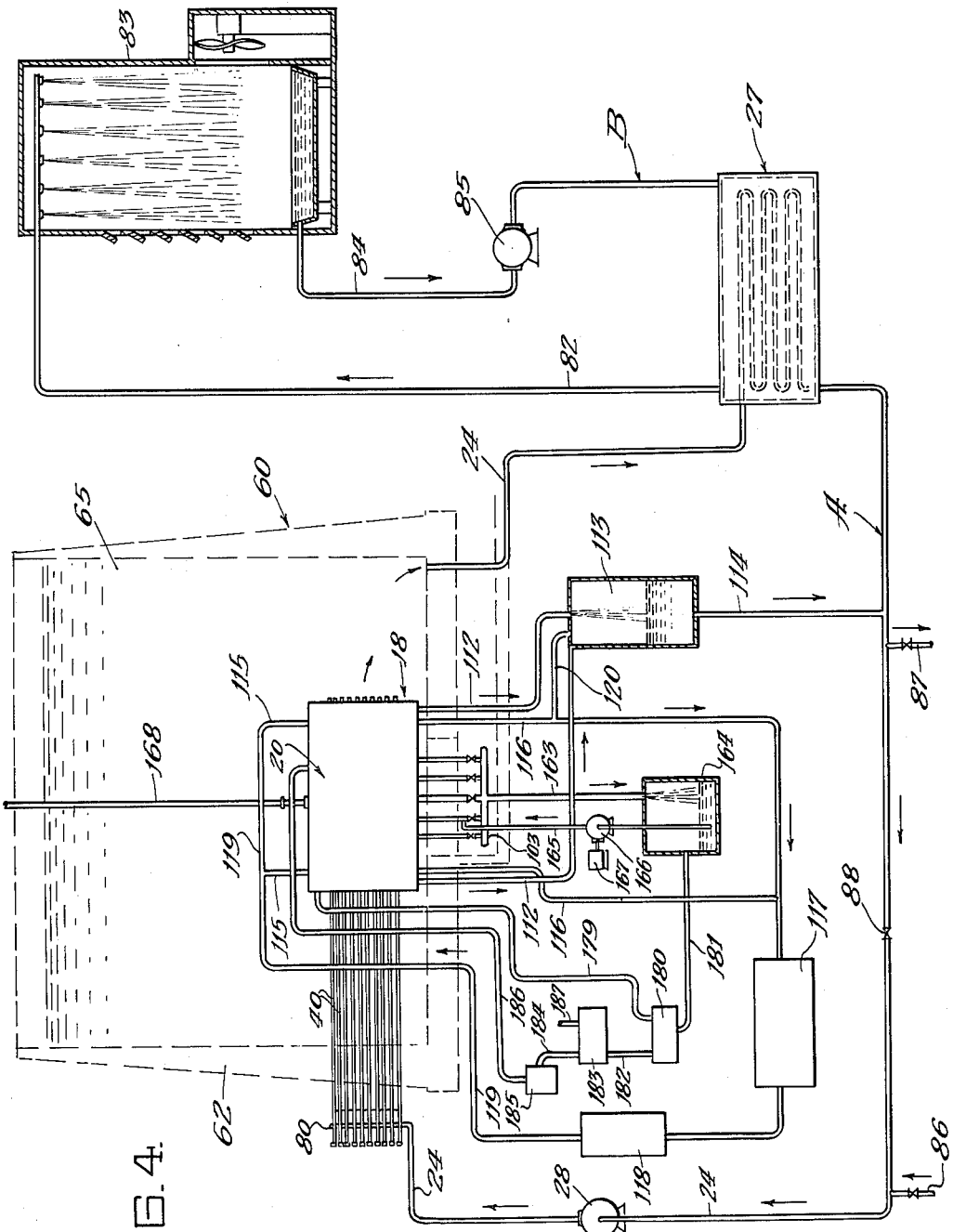

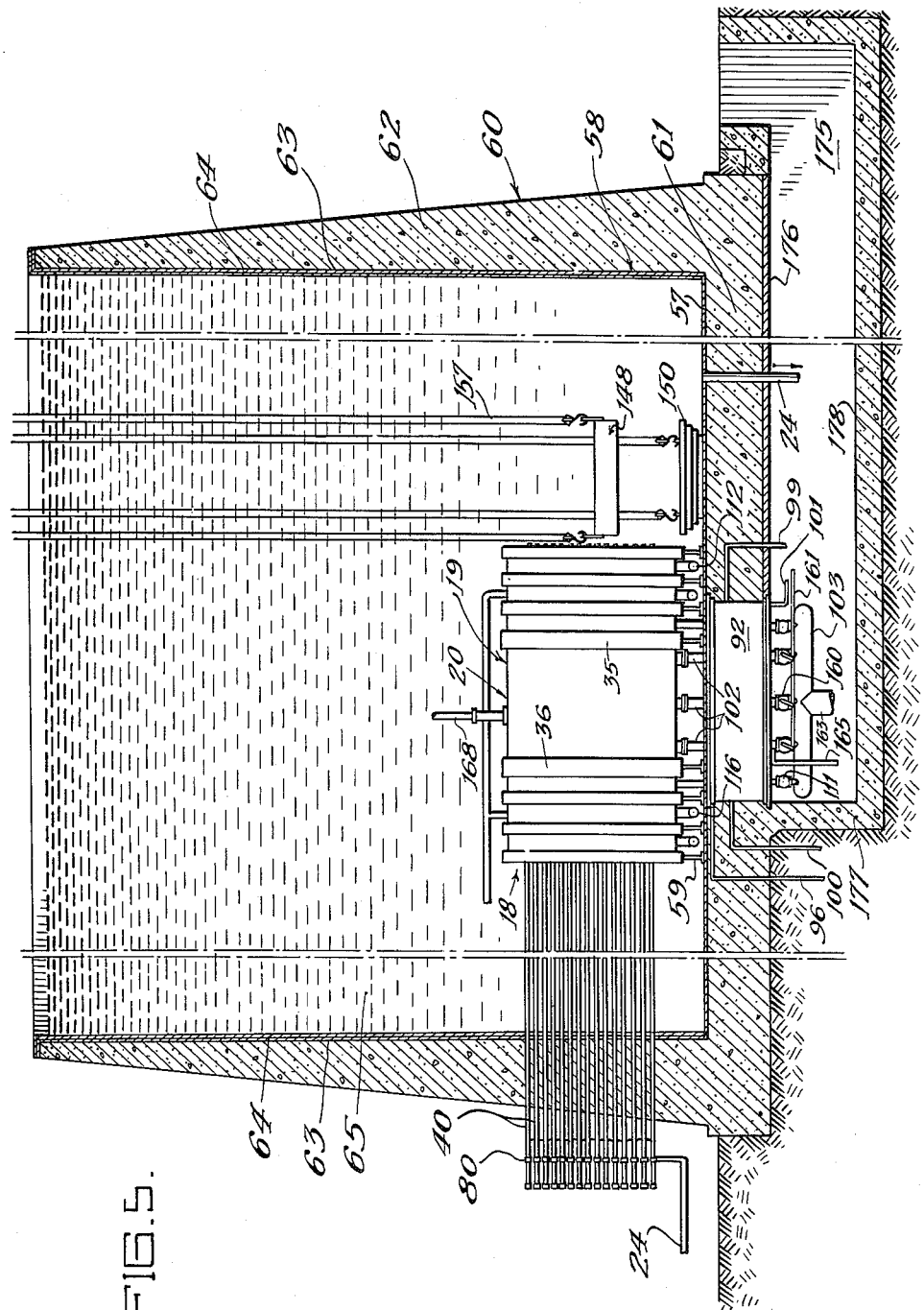

Feb. 28, 1956 E. P. WIGNER ET AL 2,736,696
REACTOR
Filed Aug. 29, 1945 13 Sheets-Sheet 5

Witnesses:
Herbert E. Metcalf
Francis W. Test

Inventors:
Eugene P. Wigner
Leo A. Ohlinger
Gale J. Young
Alvin M. Weinberg
By: Robert A. Lavender
Attorney

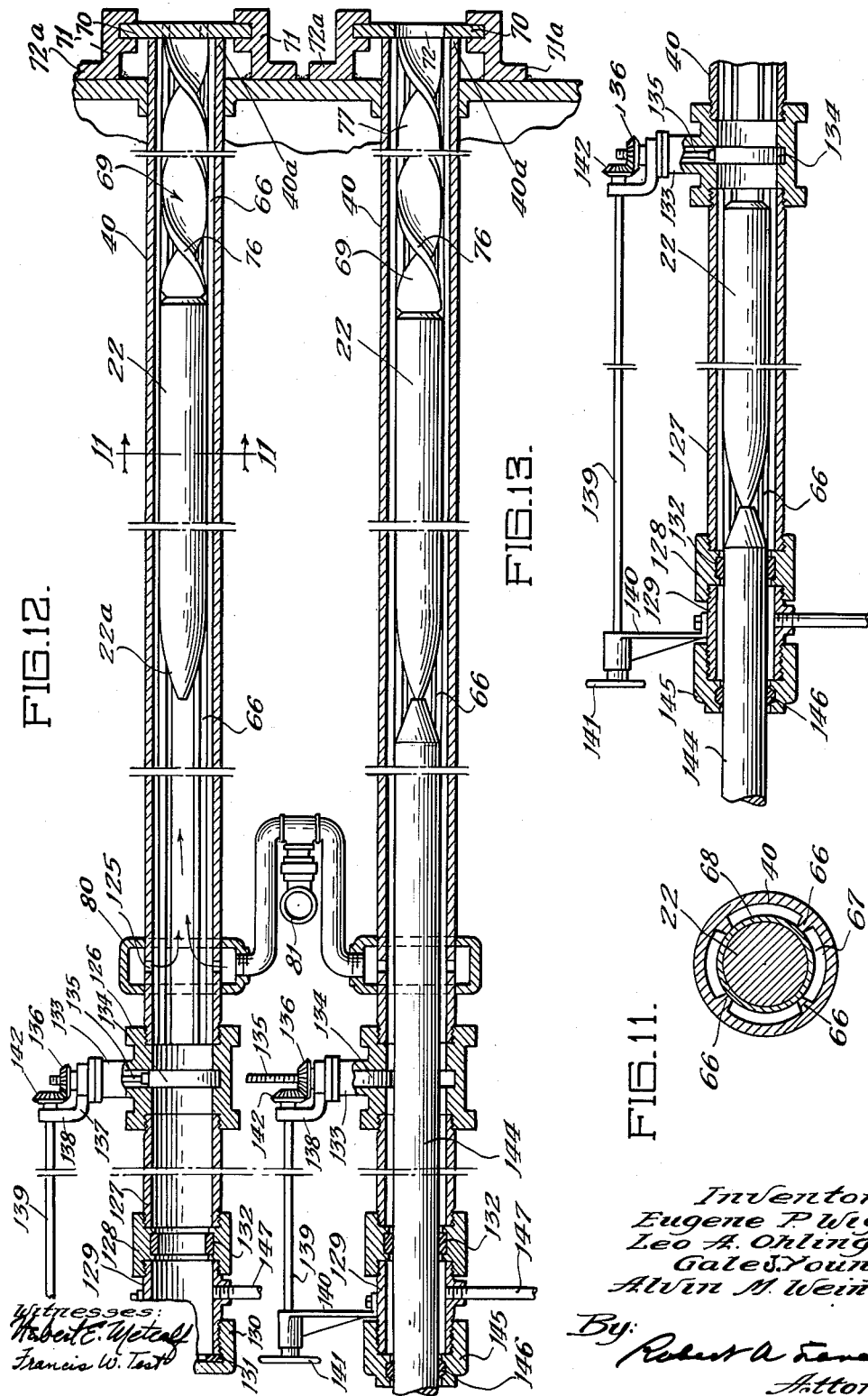

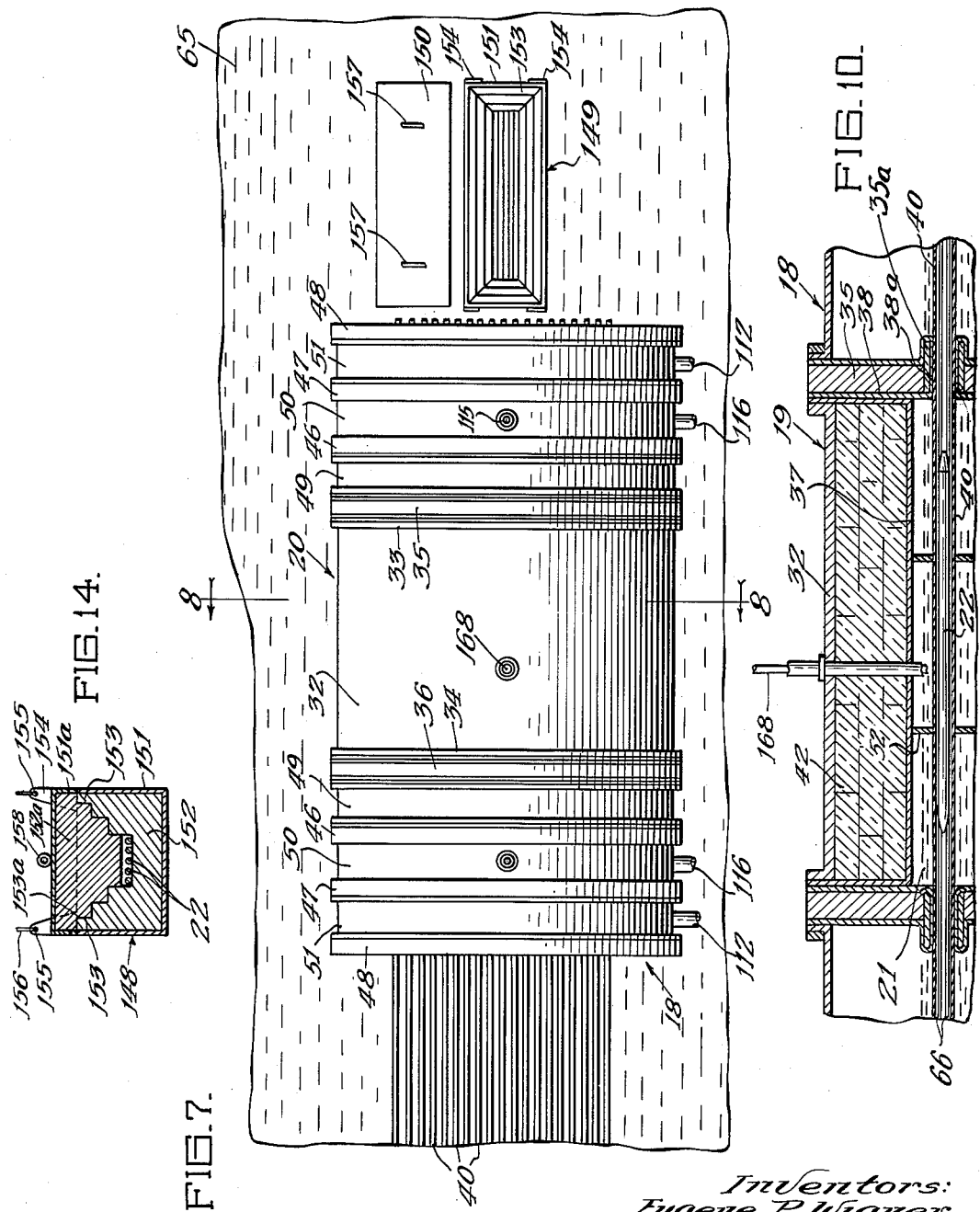

Feb. 28, 1956 E. P. WIGNER ET AL 2,736,696
REACTOR
Filed Aug. 29, 1945 13 Sheets-Sheet 8

Witnesses:
Herbert E. Metcalf
Francis W. Test

Inventors:
Eugene P. Wigner
Leo A. Ohlinger
Gale J. Young
Alvin M. Weinberg
By Robert A. _____
Attorney.

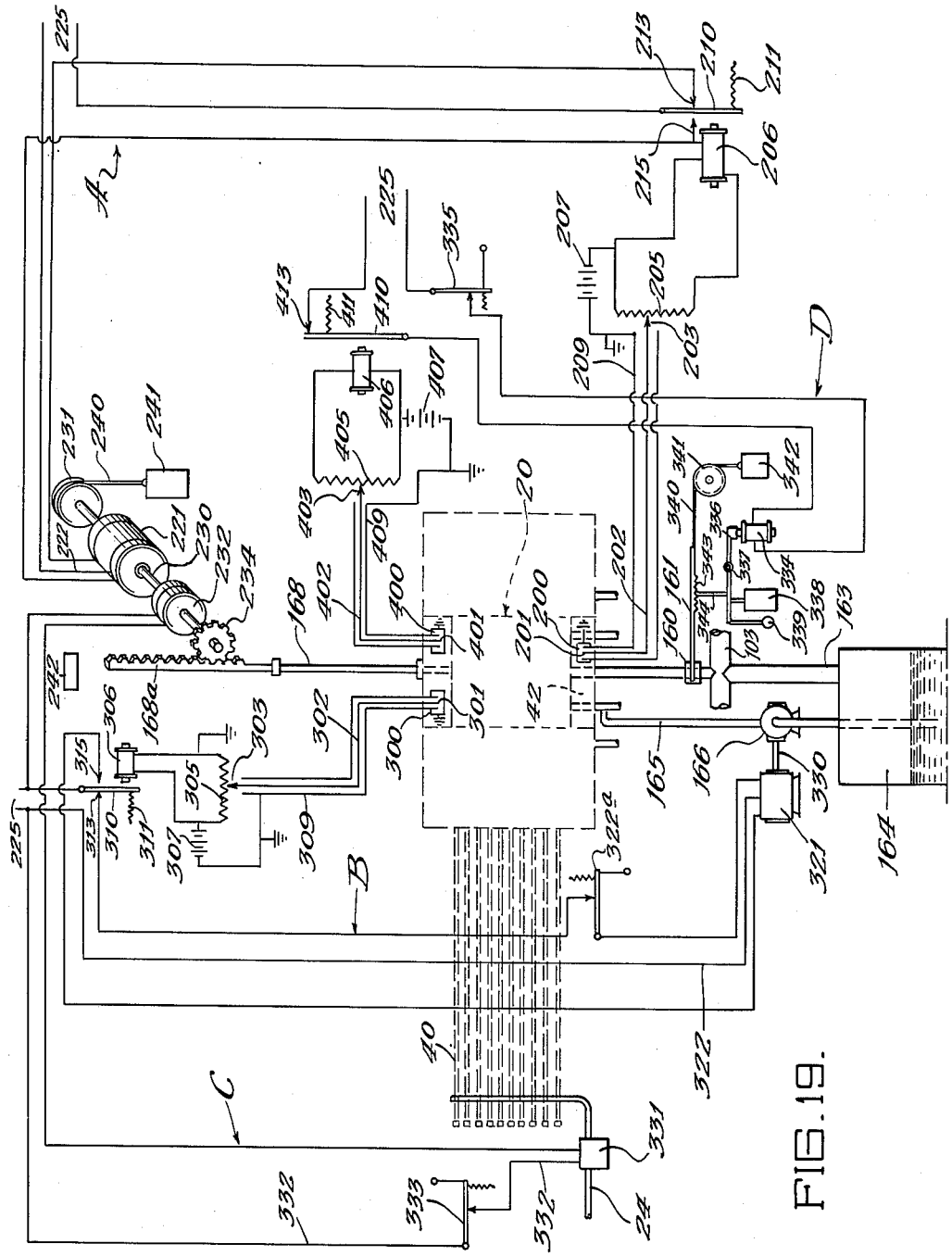

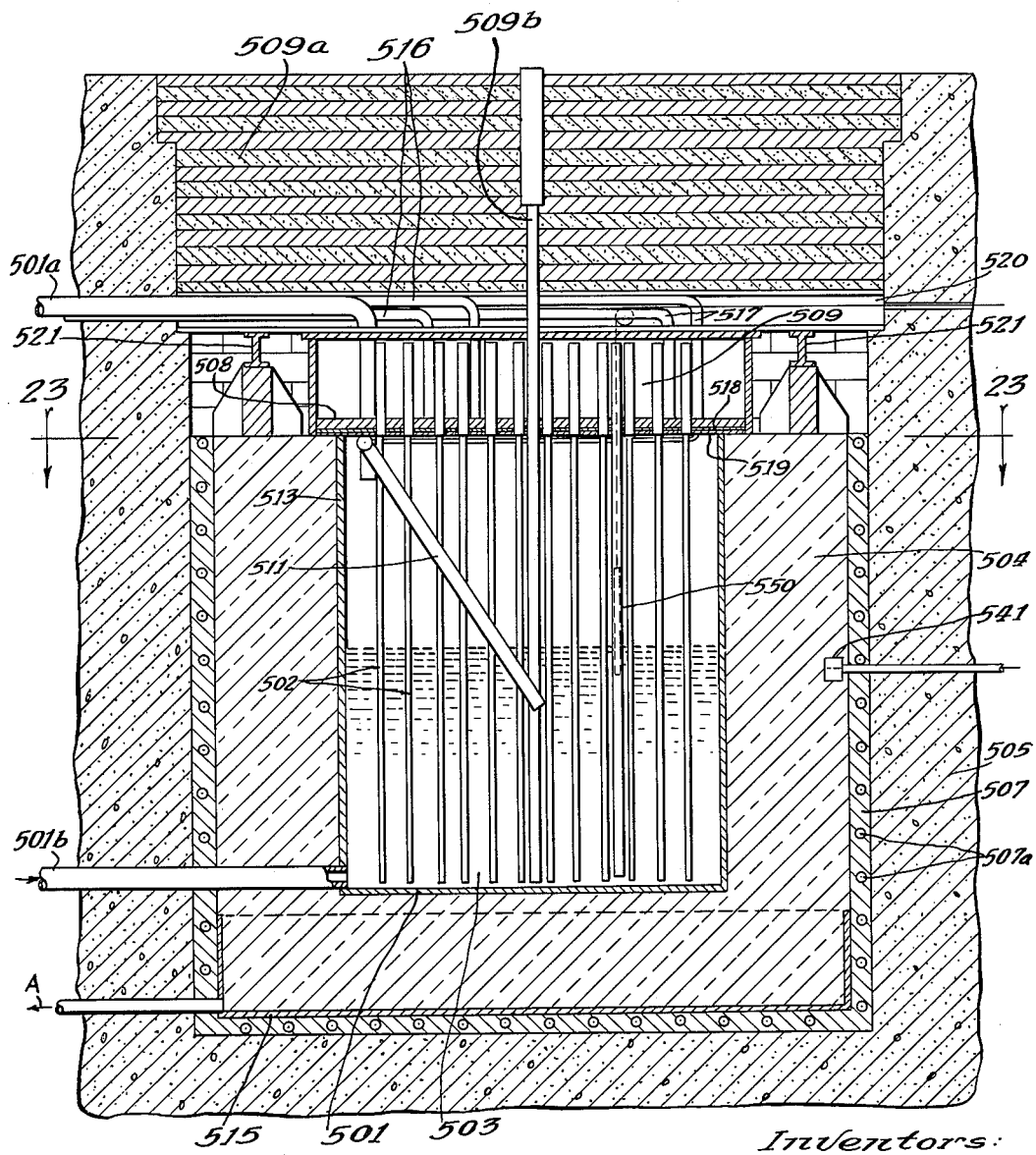

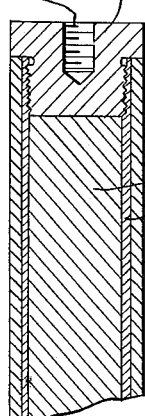
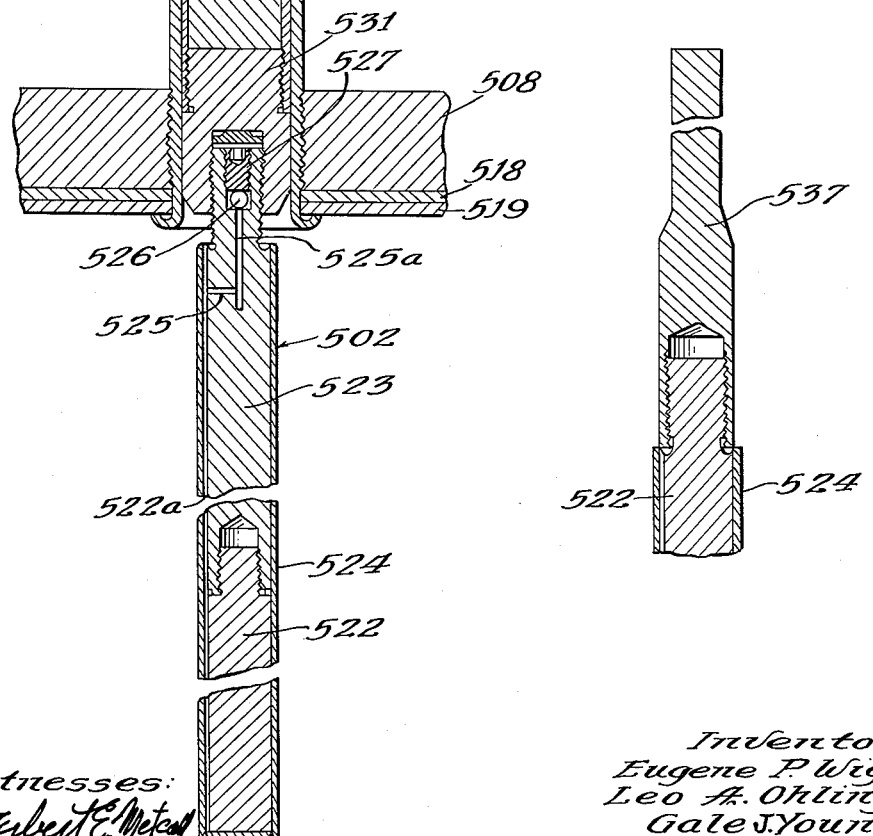

Feb. 28, 1956  E. P. WIGNER ET AL  2,736,696
REACTOR
Filed Aug. 29, 1945  13 Sheets-Sheet 12

Witnesses:
Hubert E. Metcalf
Francis W. Test

Inventors:
Eugene P. Wigner
Leo A. Ohlinger
Gale J. Young
Alvin M. Weinberg
By: Robert A. Lavender
Attorney

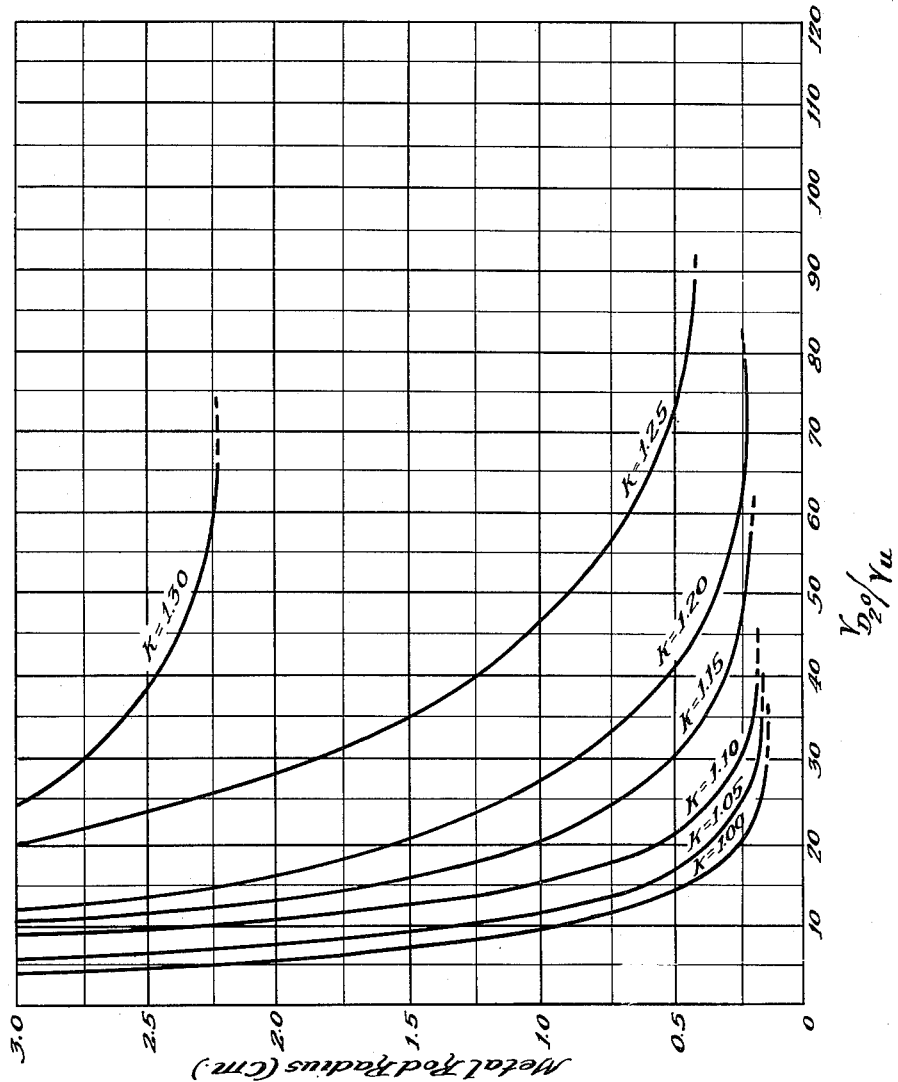

2,736,696

REACTOR

Eugene P. Wigner, Leo A. Ohlinger, Gale J. Young, and Alvin M. Weinberg, Chicago, Ill., assignors to the United States of America as represented by the United States Atomic Energy Commission Application August 29, 1945, Serial No. 613,355

7 Claims. (Cl. 204—193)

The present invention relates to the subject of neutronics, and more particularly to a suitably cooled slow neutron chain reacting system, also referred to as a neutronic reactor, or pile, the latter name having been originally adopted for the active portions of systems employing uranium bodies geometrically arranged in graphite in the form of lattice structures. The present invention specifically relates to a neutronic reactor wherein a fissionable material such as the $U^{235}$ content of natural uranium is arranged in a neutron slowing material or moderator of deuterium in some suitable form such as deuterium oxide ($D_2O$), commonly known as heavy water. As a result of the chain reaction, and when $U^{238}$ is present as for example in natural uranium, transuranic element $94^{239}$, known as plutonium, is produced. This material is fissionable and is valuable when added to natural uranium for use in a chain reacting system, because it enriches the natural uranium with fissionable material in the system so as to reduce the overall critical size; that is, that size above which the system must be built in order to effect a self-sustaining neutron chain reaction, and below which the system is normally not self-sustaining.

Natural uranium contains both uranium isotopes $U^{235}$ and $U^{238}$ in the ratio of 1 to 139. The $U^{235}$ is the isotope fissionable by slow neutrons, as will be presently explained.

The slow neutron chain reaction system, operating by virtue of nuclear fission produced by absorption of thermal neutrons in uranium is accompanied by the ejection of secondary fast neutrons liberated in a uranium body as the result of fissions of the $U^{235}$ isotope. A small portion of these fast neutrons are absorbed directly by the isotope $U^{238}$ to produce what is termed fast fission of the nuclei of this isotope with the resulting production of a few new fast neutrons. All of these fast neutrons leave the uranium bodies and diffuse through the system; that is, through the heavy water and the uranium. Some of the neutrons escape from the system and are lost. The remaining neutrons, as the result of many elastic collisions with nuclei of the heavy water and uranium, lose energy at each collision and are thereby slowed down. This slowing down process occurs during a diffusion process whereby the neutrons travel in random paths through the heavy water and the uranium bodies, colliding many times with nuclei of the heavy water and the uranium.

Some of the neutrons thus may reach a velocity corresponding to a strong so-called resonance energy of uranium. Those neutrons reaching that velocity and contacting a uranium body while at that energy, or those which are slowed to that energy while inside a uranium body, are absorbed in the nuclei of the isotope $U^{238}$ without producing fission. This absorption is known as resonance absorption. As will be explained presently, this resonance absorption of neutrons constitutes one productive source for element $94^{239}$, though, in reality, all resonance absorption of neutrons constitutes a loss of neutrons to the neutronic reaction, since the resonance neutrons absorbed might otherwise be made available to produce new fissions, provided of course that in slowing down to thermal energies the particular neutron was not absorbed in $U^{238}$ at thermal energies. This thermal absorption of neutrons by $U^{238}$ constitutes the other productive source for the element $94^{239}$.

Neutrons escaping resonance absorption in uranium continue to diffuse in the moderator and the uranium, and continue to lose energy until they finally reach thermal energy, when they are in thermal equilibrium with their surroundings. The neutrons thus slowed to thermal energy may continue to diffuse in the moderator in random paths, but without losing further energy. Some of these thermal neutrons escape from the system and are lost. A very small proportion of the neutrons while thus diffusing at thermal velocity are absorbed by the heavy water. Others are absorbed by impurities in the slowing material and the uranium. All of these absorptions constitute losses of neutrons to the neutronic reaction.

The thermal neutrons remaining to enter the uranium bodies are absorbed either in the nuclei of the isotope $U^{235}$ to produce fission or in the isotope $U^{238}$ leading to the production of $94^{239}$.

When fission occurs in the $U^{235}$ isotope, the reaction which takes place may be represented by the following:

$$92U^{235} + \text{neutron} \rightarrow A + B + \text{about 2 neutrons (average)}$$

where "A" represents "light" fission fragments having atomic masses ranging from 83 to 99 inclusive and atomic numbers from 34 to 45 inclusive; for example, Br, Kr, Rb, Sr, Y, Zr, Cb, Mo, Ma, Ru, and Rh; and "B" represents "heavy" fission fragments having atomic masses ranging from 127 to 141 inclusive, and atomic numbers from 51 to 60 inclusive; for example, Sb, Te, I, Xe, Cs, Ba, La, Ce, Pr, and Nd.

The elements resulting from the fissions appear in general to be unstable and radioactive, with half-lives varying in length in accordance with the element formed.

The absorption of thermal or resonance neutrons by the $U^{238}$ isotope gives rise to the conversion of $U^{238}$ to $U^{239}$ which ultimately decays to transuranic element $94^{239}$. The reaction is as follows:

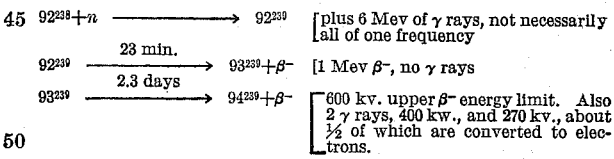

$92^{238} + n \longrightarrow 92^{239}$ [plus 6 Mev of $\gamma$ rays, not necessarily all of one frequency $92^{239} \xrightarrow{23 \text{ min.}} 93^{239} + \beta^-$ [1 Mev $\beta^-$, no $\gamma$ rays $93^{239} \xrightarrow{2.3 \text{ days}} 94^{239} + \beta^-$ [600 kv. upper $\beta^-$ energy limit. Also 2 $\gamma$ rays, 400 kw., and 270 kv., about ½ of which are converted to electrons.

The new fast neutrons resulting from the fissions in the isotope $U^{235}$ pass through the same neutronic cycle as just described, there being a certain proportion that will produce fast fission, some that will be lost to the chain reaction, and others that will reach thermal energy and be absorbed in the uranium.

Deuterium has an extremely low neutron absorption characteristic for thermal neutrons; i. e., thermal neutrons can diffuse in the deuterium with relatively little danger of being absorbed by deuterium nuclei. For this reason heavy water is an ideal moderator.

Of course, any neutron absorbing impurities in the heavy water will increase the probability of parasitic capture by such impurities.

By arranging the uranium in bodies or masses of suitable shape and size and selecting the correct volume ratio of uranium to heavy water, and, further, by suitably limiting the impurities in the uranium and the heavy water, and by limiting the escape of neutrons from the system (i. e., the percentage of neutrons escaping) by making the active portion of the system sufficiently large in size, it is possible to produce in each generation more fast neutrons by fission than were present to start the chain so that the chain reaction in the system is perpetuated. The ratio between these amounts is known as the reproduction ratio and for an operative reactor is greater than unity.

After all of the neutron losses that enter into the chain reaction have been evaluated for a specific lattice, with the exception of the loss by leakage from the exterior of the system, the size to which the system is to be built to effect a self-sustaining chain reaction has to be determined. The size at which the neutrons gained equal the neutrons lost is known as the critical size. The operating size is somewhat larger than the critical size.

There are several ways by which critical and operating sizes are determined, and it is desirable that these sizes be found within a low margin of error prior to the actual building of the full size reactor so that auxiliary equipment such as shields, for example, can be constructed of proper size and not too small to enclose the operating reactor.

One very satisfactory method of determining critical size is to measure the Laplacian ($\Delta$) in an exponential pile, i. e., a structure that is similar in all respects to the full size reactor contemplated, but is considerably smaller than that size required to make the reaction self-sustaining. A detailed discussion of how this is done can be found in the United States Patent of Enrico Fermi et al., No. 2,708,656. In case the reactor is to be built in the form of a spherical structure employing uranium bodies of any shape or size imbedded in a heavy water ($D_2O$) moderator, the following formula gives the critical overall radius:

$$R = \frac{56.5}{\sqrt{K-r}}$$

where R is the radius in centimeters and $r$ for critical size equals one.

For a rectangular parallelopiped structure rather than spherical, using a heavy water moderator, the critical size can be computed from the formula:

$$K - r = 323\pi^2 \left(\frac{1}{a^2} + \frac{1}{b^2} + \frac{1}{c^2}\right)$$

where $a$, $b$, and $c$ are the lengths of the sides in centimeters.

The critical size for a cylindrical structure using a heavy water moderator is given, irrespective of the shape of the uranium bodies by the formula:

$$K - r = \frac{323\pi^2}{H^2} + \frac{777}{R^2}$$

where H is the height in centimeters and R is the radius in centimeters. Operating sizes are also determinable from these formulae by inserting the operating value of $r$ desired.

The following table will show the approximate critical sizes for operative reactors, utilizing $D_2O$, for different values of K where K is changed due to change in geometry. In evaluating the values given in the table it must be kept in mind that the critical size is that size where the chain reaction just will become self-sustaining.

| U Metal-heavy water, K-1 | Sphere Radius | Critical Sizes in Feet, Cube Side |
|---|---|---|
| .01 | 18.5 | 32 |
| .02 | 12.3 | 21.5 |
| .05 | 7.7 | 13.4 |
| .1 | 5.45 | 9.45 |
| .2 | 3.84 | 6.65 |
| .3 | 3.14 | 5.45 |

The use of a reflector, through the action of scattering neutrons back into the reactor, raises the density of thermal neutrons throughout the reactor and this, in turn, increases the reproduction ratio of the reactor. Thus critical size ($r = 1$) with a reflector is smaller than without a reflector. Consequently the use of a reflector permits a smaller reactor to be constructed for the same K factor.

Since the neutronic reactor, when it is built to operating size, is then capable of producing fast neutrons at a greater rate than neutrons are lost, there would be an exponential rise in the neutron density to infinity (at least in theory) as the system is operated unless the density rise is controlled. This is accomplished by controlling the ratio between the neutrons lost from the chain reaction to those gained from new fissions. This can be accomplished in a variety of ways, some of which will be hereinafter explained. The point at which the exponential rise is stabilized is a matter of choice and will depend on the desired output of element $94^{239}$ as well as on considerations involving safety, and ability to remove heat from the reactor.

In order to effect a self-sustaining neutronic reaction at all in a system employing uranium and heavy water, a certain minimum amount of heavy water moderator is required. This minimum quantity is about five tons, provided an optimum arrangement of uranium bodies is used.

Referring to Fig. 24, K values for various reactor arrangements are given for metal rod geometry. In other words it can be determined from these contour curves what value of K can be expected for a given geometry specified in terms of uranium metal rods of a specific radius disposed in $D_2O$ with a given volume ratio between the $D_2O$ and the uranium. These K values are determined in accordance with the method disclosed on column 27, line 48 through column 30, line 62 of U. S. Patent No. 2,708,656 of Fermi et al.

It has been found that if the $D_2O$ has any light water ($H_2O$) in solution, the light water will pick up an extra neutron as a result of the neutron bombardment taking place during the neutronic reaction, transforming the light water into $D_2O$. Thus, as a result of the neutronic reaction the $D_2O$ moderator will become more pure resulting in a slight increase in the K factor. This factor should be considered in the design of the reactor and can be taken care of by an adjustment in the balanced or equilibrium position of the controls.

The rate of production of element $94^{239}$ will depend on the rate of absorption of neutrons by $U^{238}$, which is proportional to the rate at which fissions occur in the $U^{235}$. This, in turn, is governed by the thermal neutron density in the active part of the reactor. Thus, for maximum production of element $94^{239}$ for a given system, it is essential that the thermal neutron density be at a maximum.

Considerable heat is generated during the chain reaction, primarily as a result of the fission process. When the system is operated for an extended period of time at a high production output of element $94^{239}$, the large amount of heat thus generated must be removed in order to stabilize the chain reaction.

Most of the heat in an operating device is generated as the result of the nuclear fissions taking place in the $U^{235}$ isotope. Thus the rate of heat generation is largely proportional to the rate at which the fissions take place. In other words, as the rate of generation of neutrons is increased, a greater amount of coolant must be passed through the reactor in order to remove the additional heat thus generated. Thus the highest attainable neutron density at which a system can be operated for an extended period of time is limited by the rate at which the generated heat can be removed. That is to say, the maximum power, or element $94^{239}$, output of a system is limited by the capacity of the cooling system. An effective cooling system is therefore a primary requirement for high power operation of a neutronic reactor.

Heavy water is by far the most efficient moderator presently known. The outstanding quality of the deuterium nucleus for slowing down neutrons arises first from its low capture cross section for thermal neutrons and second from its small mass which results in large reduction of neutron energy at each collision. In the latter respect it is surpassed only by hydrogen (of mass 1). A neutron requires about 35 per cent more collisions with deuterium, on the average, to undergo a given energy reduction, than with hydrogen, but only about one fifth as many with deuterium as with carbon, and about one fourth as many as with beryllium. The thermal neutron capture cross section of deuterium is much less than that of other suitable light nuclei, being about 5 times smaller than that of carbon, 15 times smaller than that of beryllium, and 500 times smaller than that of hydrogen.

Among deuterium compounds, heavy water is outstanding as a moderator because oxygen has also a very low capture cross section, the number of deuterium nuclei per unit volume is high in heavy water, it has acceptable chemical properties, and it has low viscosity and high specific heat, whereby the heat generated in it by impact of fast neutrons is easily conveyed to the cooling system when the heavy water is used in a cooled neutronic reactor.

The net gain in neutrons provided by the low neutron absorption in the heavy water may be used up, for example, by the insertion of more parasitic neutron absorbers into the system than could be tolerated with other and less efficient moderators. As high power output is clearly desirable, the parasitic neutron absorbers may take the form of cooling tubes and coolant volume. As more coolant can be tolerated in a heavy water system, high powers can be attained without boiling the moderator, and the system can still be made smaller than, for example, a uranium-graphite system of equal power.

It is an object of the present invention, then to provide a chain reacting system having a neutron moderator characterized by very high slowing capability while at the same time having very low neutron absorption so that neutron losses in the slowing medium are reduced to a minimum.

It is another object to combine a neutron moderator with uranium bearing material such that a controllable self-sustaining nuclear chain fission reaction may be obtained with resultant regulated production of neutrons, liberation of heat, the production of radioactive fission products and new elements, both radioactive and stable, caused by the absorption of neutrons.

Heavy water, of course, is a liquid and, therefore, must be contained in a tank. This tank may serve as the reactor within which the neutronic reaction takes place. The heat generated during the reaction may be removed by flowing a coolant through the tank necessitating the use of a plurality of tubes in the tank. These tubes pass through the tank walls and are connected to a circulating system.

During the neutronic reaction the tubes inside the tank and the tank walls become highly radioactive with the result that the maintenance of conventional packing glands around the tubes where they pass through the tank walls is most impractical, if not impossible. It is important, however, that provisions be made to prevent the loss of heavy water from the system and obviously the greatest possibility for this loss to occur is through the perforations in the tank walls. Heavy water as it is produced today is expensive and for that reason even slight losses cannot be tolerated.

Thus it is one of the objects of the present invention to provide a permanently operative neutronic reactor of the heavy water type whereby loss of heavy water from the system is prevented. This is made possible without requiring constant maintenance of parts closely associated with the highly radioactive portions of the system.

Among other objects of the present invention are:

To provide a neutronic system employing a fissionable material as the source of fast neutrons and an efficient fluid moderator capable of slowing fast neutrons to thermal energy;

To provide a neutronic system employing a fissionable material as the source of fast neutrons and heavy water as the moderator ;

To provide such a system wherein during its operation for extended periods of time at high neutron densities the temperature is stabilized;

To provide means for preventing losses of the fluid moderator due to leakage from the reactor or contamination by light water;

To provide a neutronic system from which the active fissionable material, directly following extended periods of operation, may be removed from the reactor and replaced;

To provide an effective emergency control for a neutronic system whereby the overall size of the active part of the reactor is rapidly reduced when required to stop the chain reaction; and To provide a neutronic system having a high power output and one that is safeguarded in the event of failure of the cooling system by having automatic means for continuing proper cooling of the active fissionable material in the system promptly following the failure of the original cooling system.

The foregoing constitute some of the principal objects and advantages of the present invention, others of which will become apparent from the following description read in conjunction with the drawings, in which Fig. 1 is a diagrammatic view of a preferred form of the invention showing a uranium-heavy water system cooled by means of a coolant circulated through tubes disposed in the active part of the reactor;

Fig. 2 is a diagrammatic view of one modified form of the invention, showing a uranium-heavy water system cooled by circulating the moderator outside the reactor through a heat exchanger and then returning the cooled moderator to the reactor;

Fig. 3 is a diagrammatic view of a second modified form of the invention showing the uranium and heavy water in the form of a slurry cooled by circulation of the slurry outside the reactor over a heat exchanger and then returning it to the reactor;

Fig. 4 is a schematic view of the reactor enclosed in a water and concrete shield showing the light water cooling circuit, the helium circuit, and the heavy and light water leakage circuits;

Fig. 5 is an enlarged side elevational view of the reactor surrounded by the light water and concrete shield (in section) and showing the relationship between the reactor and the dumping coffin;

Fig. 7 is a top plan view of the reactor shown in Fig. 6;

Fig. 10 is an enlarged fragmentary longitudinal view shown partially in side elevation and partially in section through the top portion of the reactor showing the graphite shield surrounding the reactor and further illustrating one uranium rod disposed in one of the cooling tubes;

Fig. 11 is an enlarged vertical sectional view taken on the line 11—11 of Fig. 12;

Figure 15:
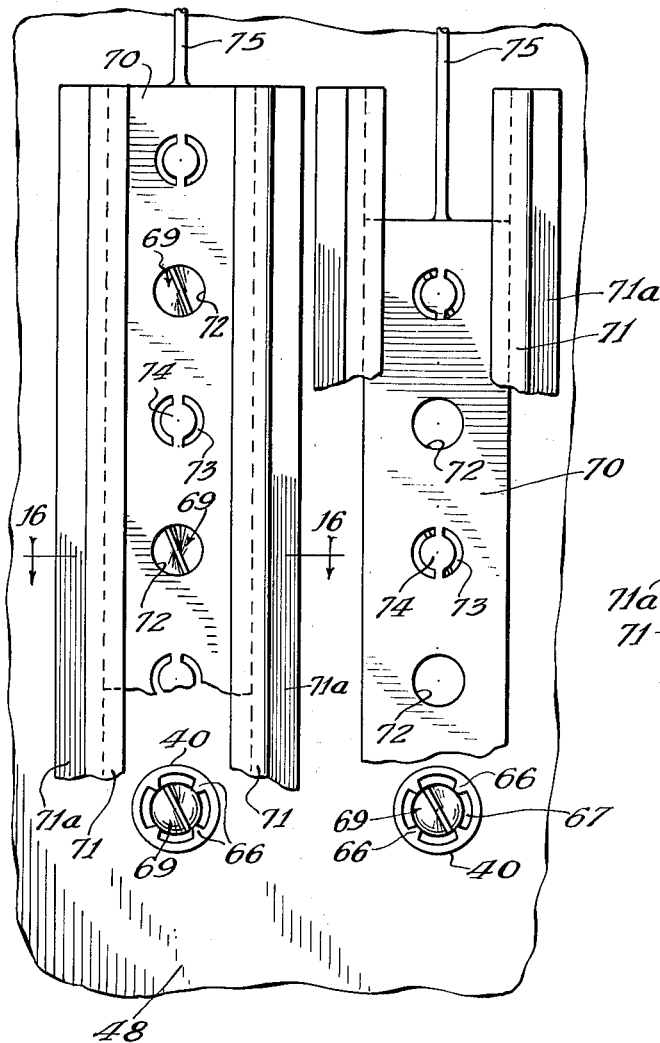
Figure 16:
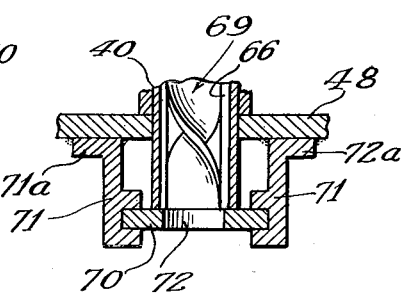
Figure 18:
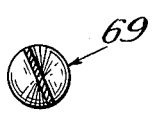
Figure 17:
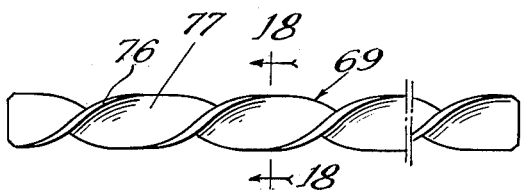
Figure 23:
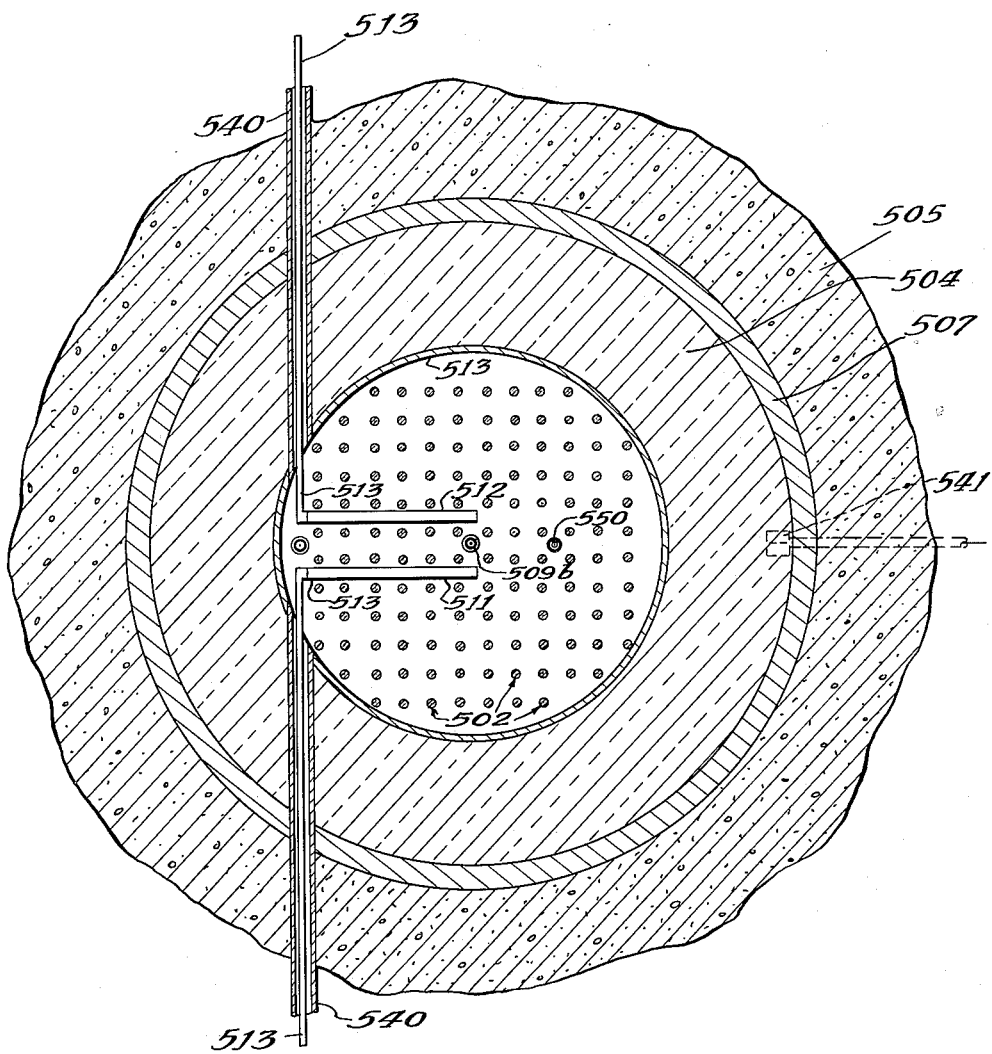

Fig. 12 is an enlarged, fragmentary, horizontal view shown partially in side elevation and partially in section through two of the cooling tubes showing primarily the inlet header and further showing in the upper tube a uranium rod in its normal position in the reactor with the header valve closed and the cooling water circulating while in the lower tube showing the header valve open and the plunger in position to remove the uranium rod from the reactor;

Fig. 13 is a fragmentary, horizontal view shown partially in elevation and partially in section and corresponding to a portion of Fig. 12 but showing a uranium rod in position in front of the header valve and about to be charged into the system by the plunger;

Fig. 14 is an enlarged, vertical, transverse sectional view through the coffin shown in Fig. 7, but illustrating uranium rods in place in the coffin with the lid closed;

Fig. 15 is an enlarged, fragmentary, front elevational view of two holding plates, one shown in the discharge position for removal of the uranium rods from the reactor, and the other plate shown in the rod holding position;

Fig. 16 is a horizontal sectional view taken on the line 16—16 of Fig. 15 and showing in plan view the dummy rod;

Fig. 17 is an enlarged fragmentary plan view of a dummy rod;

Fig. 18 is a transverse sectional view of the dummy rod shown in Fig. 17 and taken on the line 18—18 of Fig. 17;

Fig. 19 is a schematic line diagram showing an electrically operated control circuit for the system, the electrical circuit being reduced to lowest terms for illustrative purposes;

Fig. 20 is a vertical sectional view of a modified neutronic reactor having deuterium oxide as the moderator and vertically disposed uranium rods, the outer portions of the shield being broken away;

Fig. 21 is an enlarged fragmentary vertical sectional view through a portion of the reactor of Fig. 20, showing in particular details of a uranium rod;

Fig. 22 is an enlarged vertical sectional view of a portion of a uranium rod equipped with an attached adapter for removing the uranium rod from the reactor;

Fig. 23 is a horizontal sectional view taken on the line 23—23 of Fig. 20; and

Fig. 24 is a graph showing K contour lines for uranium metal rods immersed in $D_2O$.

Referring to Figs. 1 to 3, inclusive, of the drawings three embodiments of the invention are diagrammatically shown. In the embodiment illustrated in Fig. 1, the heat is removed from the active part 20 of the reactor by means of a separate coolant passed through the reactor in suitable tubes. In Fig. 2, a system is shown wherein the heavy water moderator is circulated out of the reactor, passed through a heat exchanger where the heat is extracted, is then passed over the uranium bodies and finally is returned to the reactor. The heavy water may be returned direct to the reactor after cooling and not over the uranium bodies. Fig. 3 shows a third species of the invention wherein the uranium is in the form of a slurry of small particles held in suspension in the heavy water moderator. In this last arrangement, both the uranium and the heavy water moderator are circulated out of the reactor, passed through heat exchangers for extraction of heat and then are returned to the reactor.

Referring again to Fig. 1, the active portion 20 of the reactor may be termed the reactor tank and contains a quantity of heavy water 21. The cooling tubes 23 may be made of aluminum and extend through the reactor tank 20. The uranium is shown at 22 in the form of horizontally disposed rods contained in the tubes 23. The coolant, passing through the tubes 23, flows in heat exchange relationship with the uranium rods 22 and is circulated in a closed system comprising piping 24, inlet and discharge headers 25 and 26 respectively, a heat exchanger 27 for extracting the heat from the coolant and a pump 28.

In Figs. 2 and 3, the parts of the devices corresponding to those shown in Fig. 1 bear identical reference characters followed by the letter "a" in the case of Fig. 2, or "b" in Fig. 3.

In Fig. 2, the uranium 22a is in the form of vertical rods suspended in tubes 23a disposed vertically in the moderator 21a. Conventional means such as cables 29 suspended from spiders 30 supported in header 25a hold the uranium rods 22 in place. The heavy water 21a is withdrawn from the reactor 20a through piping 24a, is passed through a heat exchanger 27a, and is then pumped back into the reactor by pump 28a through tubes 23a. The coolant is thus circulated in heat exchange relationship with the uranium 22a. The tubes 23a are open at the bottom to discharge the heavy water into the reactor tank 20a.

In Fig. 3, the uranium 22b is in the form of small particles held in suspension in the heavy water 21b. Both the uranium and the heavy water as a slurry, are circulated through pipe 24b, heat exchanger 27b, and are returned to the reactor tank 20b by pump 28b.

As a detailed specific example of a suitably cooled uranium heavy water system, the embodiment diagrammatically shown in Figs. 4 to 19 inclusive is selected as a preferred embodiment. As coolants for this type of system, light water and diphenyl, for example, are two satisfactory liquids but there must be a proper relationship between the uranium, the heavy water, the tubes for circulating the light water or diphenyl through the reactor, and the light water or diphenyl in the tubes. This relationship must be such that the reproduction ratio is greater than unity; that is, the ratio between the neutrons gained to those lost to the chain reaction. Heavy water itself may be used as the coolant in this embodiment. This is particularly desirable where extremely high power outputs are sought, because the low neutron absorption characteristic of this material permits the presence of a very large quantity of this coolant in the active part of the reactor without reducing the reproduction ratio of the system below unity.

In the present embodiment, light water is selected as the coolant and it is circulated through the reactor in aluminum tubes. Beryllium is also suitable as tube material, and may be more desirable than aluminum in at least two respects; that is, it has a lower absorption for thermal neutrons, and in itself is effective as a neutron slowing material.

As an example of an operative system, an output of about 50,000 kilowatts, the electrical equivalent of the heat energy removed from the reactor, can be realized in a system employing about ten tons of heavy water and six tons of uranium metal in the form of rods. This presupposes that a peripheral neutron reflector is used and for illustrative puposes a graphite reflector has been selected. A considerable number of neutrons that might otherwise be lost by escaping from the active portion of the system are reflected back into the latter by the scattering or reflecting effect of the neutron-reflecting material, and thus a small reduction in overall size for the active part of the reactor can be effected by using a reflector. About 80 tons of graphite are required and such a system is illustrated in the drawings and the description to follow. Cooling water is circulated through the system at the rate of 13,000 gallons per minute.

It is recognized, of course, that other arrangements can be employed than those shown and the uranium may be in one of a variety of forms. For example, the uranium may vary in size and shape from small particles to larger lumps or bodies in any convenient shape, such as spheres, tubes, or rods. The uranium may be in the form of metal, or it may be in a compound such as $UO_2$ or $U_3O_8$. Unless otherwise specified reference to uranium bodies is intended generically to mean bodies including the metal or its compounds. If desired, the natural uranium in such bodies may be enriched as to its isotope $U^{235}$ content, or with other fissionable material, such, for example, as $94^{239}$.

Again for illustrative purposes, the uranium rods are shown disposed horizontally in the heavy water moderator. They may be disposed vertically or even at some inclined position with equally satisfactory results.

Since heavy water has a low absorption characteristic for thermal neutrons, the actual spacing of the uranium rods in this moderator is not as critical as in the case where a moderator such as graphite is used. In graphite, for example, because of the probability of its absorbing thermal neutrons, it is important that the uranium bodies be so arranged that neutrons have a high probability of entering a uranium body promptly after being slowed to thermal energy. With heavy water, however, thermal neutrons may diffuse larger distances in the moderator without being absorbed by the heavy water. Thus, generally speaking there is a greater range of body spacings that can be tolerated in a heavy water system than in one wherein graphite is employed as the moderator.

Referring now to Figs. 4, 6, 8 and 10, the neutronic reactor is shown at 18 and consists essentially of an elongated horizontally disposed cylindrical tank or shell. The center portion 19 of the reactor is the active part of the system wherein the neutronic reaction takes place and comprises a cylindrical tank 20 containing a quantity of heavy water 21. This tank 20 may be referred to as the reactor tank.

The reactor tank 20 is a horizontally disposed cylindrical aluminum lined, steel tank about 8 feet in diameter and 9 feet long containing 10 tons of heavy water 21.

Figure 8:
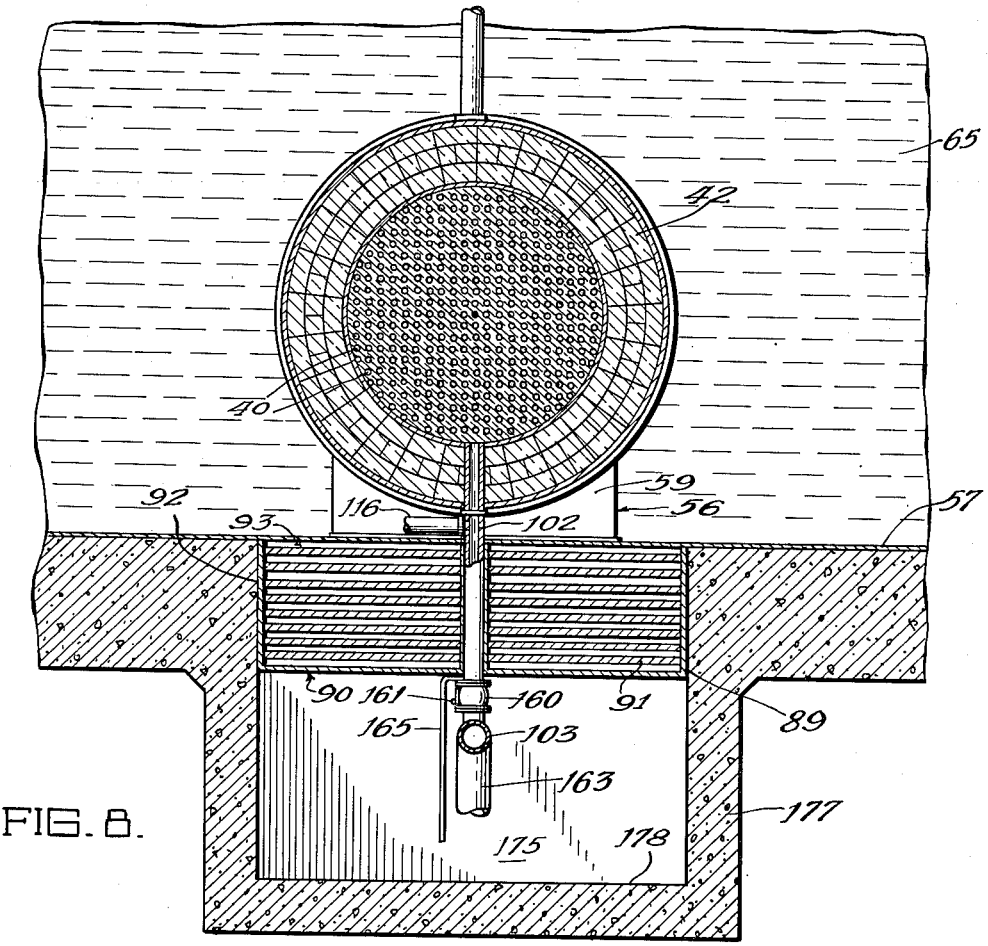
Fig. 8 is a transverse sectional view taken on line 8—8 of Fig. 7, and shown partially in elevation.

In all, there are approximately 460 rods in the reactor arranged in a square geometry as shown in Fig. 8, with the rods spaced 4 inches apart center to center. Each rod is 2 centimeters in diameter and 7 feet long, and in this example comprises natural uranium metal, as explained below.

Figure 6:
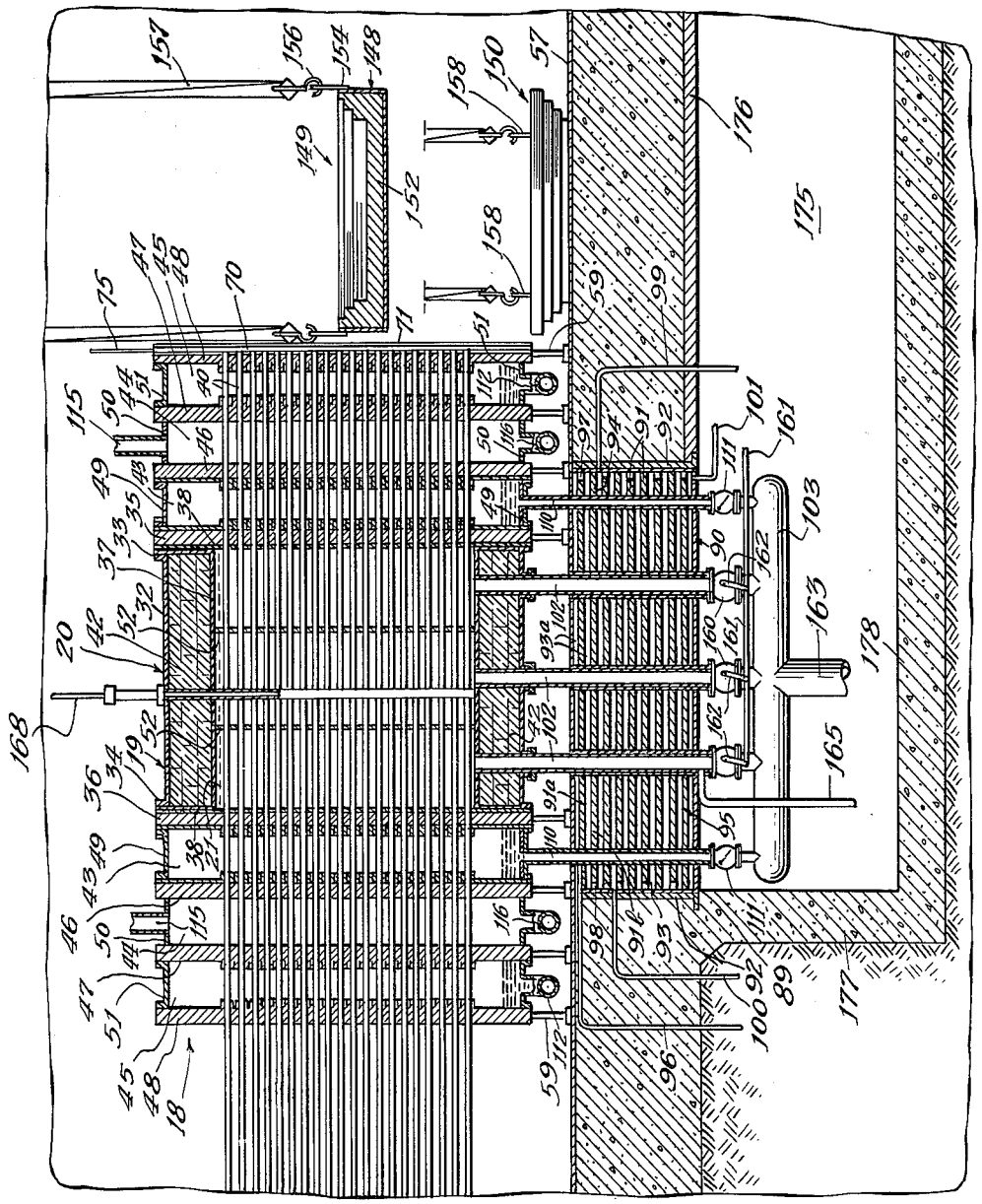
Fig. 6 is an enlarged vertical longitudinal sectional view taken through the reactor and coffin, shown partially in elevation, and showing the steel and water shield below the reactor and the mechanism employed for effecting an emergency discharge of the moderator from the system.

The side wall or shell of the cylindrical tank 20 is shown at 32 in Fig. 6 and is made of steel and is flanged at its opposite ends at 33 and 34. To these flanges are secured steel end walls 35 and 36 respectively, which also serve as tube sheets as will presently be explained. The tank 20 is lined on its inner face with aluminum lining 37, on the sides or shell of the tank, and 38, on the end walls or tube sheets 35 and 36, as corrosion of aluminum by heavy water is much less than corrosion of steel, for example.

The uranium rods 22 are disposed in tubes 40 (see Fig. 10) which in turn extend through the end walls of the tank 20 and constitute circulating tubes through which the light water may be passed for stabilizing the temperature of the chain reaction as will be brought out hereinafter. The end walls or tube sheets 35 and 36 are perforated to accommodate the tubes 40. The tube sheets are supporting members for the tubes 40 and the uranium rods 22 and thus have a substantial thickness.

Figure 9:
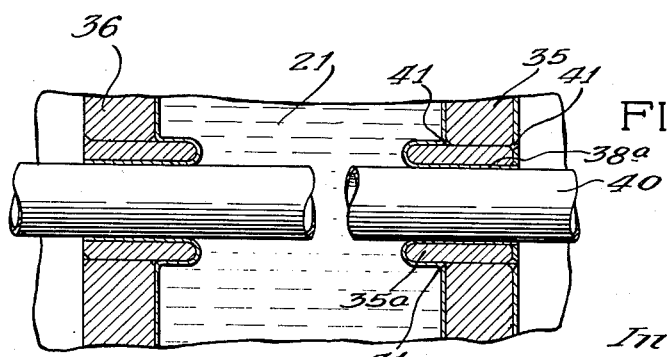
Fig. 9 is an enlarged fragmentary detailed sectional view through the tube sheets at both sides of the reactor showing in elevation one cooling tube passing through said sheets.

As shown in Figs. 9 and 10, each of the perforations is provided with steel sleeve 35a having its inner surface lined with aluminum as shown at 38a. This may be accomplished by making each hole in the tube sheets 35 and 36 somewhat larger than the outer diameter of the tubes 40, then inserting the steel sleeve 35a into this perforation and welding this sleeve to the tube sheet as indicated at 41. The inner diameter of this sleeve is such that the sleeve when provided with aluminum lining 38a fits snugly over the tube 40. The aluminum lining 37 (see Fig. 10) on the inside of the tank sides is spaced from the steel shell 32 to provide space for a graphite neutron reflector 42 extending circumferentially about the tank and having a thickness of about 18 inches.

The reflector 42 serves to reflect back into the heavy water moderator some of the neutrons that normally would escape from the system. As shown in Figs. 6, 8, and 10 graphite in the form of blocks is employed, though other suitable material such as paraffin may be used. Graphite is readily machinable with conventional wood working machine tools and hence the block form is a convenient shape for the graphite.

In assembling a reflector for a liquid moderator pile the positioning of the reflector inside the reactor tank with the liquid in direct contact with the reflector material will, of course, give the highest neutronic efficiency. However, a reflector placed inside of the reactor tank must be able to exclude the moderator from the reflector material and for that reason the reflector if used inside could not be built from porous material, such as graphite, or any material in the form of bricks, because any impurities in the moderator (such as corrosion products) would lodge in the reflector material or between reflector blocks and become more and more radioactive during operation of the reactor thus producing localized "hot spots." To prevent this occurrence, the reflector would have to be one piece, such as, for example, a beryllium casing inside the tank, or a beryllium oxide lining with a glazed surface or similar arrangement and at present such construction is impractical.

It has been found that if the tank wall is not made too thick, and is made of materials having not too high a neutron danger coefficient, then it is possible to place the reflector on the opposite side of the tank wall from the moderator and still have an efficient neutron interchange and reflection back into the liquid moderator in spite of the neutron absorption characteristics of the tank wall, such as the reflector 42. This arrangement is particularly practical from a nuclear physics point of view in the $D_2O$ reactors herein described, because they are small, and consequently have a high neutron loss from the exterior thereof. A certain percentage of the escaping neutrons can be absorbed by the tank wall, and still there will be a high percentage of neutrons returned to the reactor by the reflector.

At each end of the cylindrical tank 20 are three end chambers 43, 44 and 45 formed by spaced steel walls or tube sheets 46, 47 and 48 and circumferentially disposed steel shell walls 49, 50 and 51 respectively. The function of these chambers 43, 44 and 45 will be brought out presently.

The tubes 40 extend throughout the length of the tank 20 and continue through all of the end chambers 43 to 45 inclusive, passing through each of the tube sheets 35, 36, 46, 47 and 48. In the tank 20 perforated aluminum diaphragms 52 are interposed between the opposite tube sheets 35 and 36 through which pass the tubes 40. The diaphragms serve as intermediate supports for the tubes. This, of course, could be accomplished by other conventional means, such as by hangers.

Referring to Figs. 4, 5, 6 and 8, the reactor is supported on a cradle generally indicated at 56 on the bottom 57 of a cylindrical steel tank 58. This cradle 56 comprises spaced supporting members 59 which in turn rest on the bottom of the steel tank 58. A supporting member 59 is disposed under each of the tube sheets 35, 36, 46, 47 and 48. The tank bottom 57 rests on a concrete slab 61. A cylindrical concrete wall 62 about 10 feet thick projects upwardly from the concrete slab 61 and completely surrounds cylindrical side wall 63 of the steel tank 58. The wall 63 of the tank 58 is lined with lead as indicated at 64. The steel tank 58 is about 70 to 80 feet in diameter and 40 to 60 feet high and is filled with light water 65 completely submerging the reactor 31 in water. Thus an effective neutron and gamma radiation shield 60 is provided, the concrete serving finally to absorb any radiations which may penetrate the water, lead and steel layers.

The aluminum tubes 40, as shown in Fig. 5, extend continuously from outside the concrete wall 62, through the concrete wall, lead liner 64, steel wall 63, and then project through the light water 65, into the end wall of the adjacent light-water leakage chamber 45 (Fig. 6), and then continue through the intermediate chambers 44 and 43 and the reactor tank 20, terminating after passing through the most remote light-water leakage chamber 45. These tubes are ribbed as indicated at 66 (see Figs. 10 and 11). Between the ribs are light water channels 67. As best shown in Fig. 11, the ribs 66 are disposed on the inner faces of tubes 40 and extend longitudinally of the tubes forming supporting members for the uranium rods 22 and approximately centering the rods in the tubes. Enveloping each uranium rod 22 is an aluminum coating or sheath 68 completely sealing the uranium in aluminum to prevent light water which passes through the channels 67 from attacking the uranium. This sheath 68 is about one-half millimeter in thickness, and the water annulus surrounding the rod 22 is about 2.2 millimeters in thickness. Each ribbed tube 40 is about 3 millimeters in thickness.

The cooling water passing through the tubes 40 enters the pile through ring headers 80 (Figs. 4, 5 and 12) and flows in a direction from left to right through the tubes, as shown in the drawings. Each ring header 80 is supplied with water from a header pipe 81, which in turn is fed by the main supply pipe 24 (Fig. 4).

As shown in Figs. 4 and 5, the cooling water passing through the tubes 40 is discharged directly into the steel tank 58 forming part of the water shield. The shield water 65 in turn may be circulated through an external primary cooling circuit shown at A in Fig. 4. The water in this circuit may be cooled by being circulated in heat exchange relationship with a secondary cooling circuit B.

Cooling circuit

The primary cooling circuit comprises a pipe system 24 drawing light water 65 from the water shield, and then circulates it through the heat exchanger 27, and by means of pump 28 conveys the water to the pipe headers 81 (Fig. 12) from which the water passes through ring headers 80 into the tubes 40. This water is finally discharged out the open ends of tubes 40 into the shield water 65.

The secondary cooling circuit B comprises the heat exchanger 27 wherein heat is extracted from the hot water in the primary circuit A, a pipe 82 that conveys the hot water in the secondary circuit to a cooling tower 83 where the water is cooled by evaporation, and a return pipe 84 that conveys the cooled secondary water stream back to the heat exchanger 27 in response to a circulating pump 85.

Rather than recirculate the cooling water in the primary circuit, it may be preferred to pass only fresh water through the pile. This may be advantageous where the pile is situated close to a river or a large body of water. The coolant may then be introduced into the cooling circuit at 86 and be withdrawn at 87 and disposed of in some suitable manner. A water purifying and filtering plant may be required in such an arrangement. In the circuit shown, a shut-off valve 88 would be in its "off" position under these circumstances.

During normal operation of the system the uranium rods 22 (Figs. 10 and 12) are disposed in the active portion 19 of the reactor 18. As best shown in Fig. 12, the cooling water entering through the header pipes 81 is introduced into the tubes 40 through ring headers 80. This water, as indicated by the arrows in Fig. 12, passes through openings 125 in the walls of the tubes 40 and then flows in the direction from left to right through the tubes 40. When the cooling water reaches a uranium body 22 it is divided by the tapered end 22a of the uranium rod 22 into separate streams passing through the water channels 67 bounded by the uranium rod 22, the wall of the tube 40, and the inwardly projecting ribs 66 on the inner face of the tube 40. Thus, the water is passed in heat exchange relationship with the coating 68 surrounding the uranium rod 22 and thereby extracts heat from the rod generated as a result of the neutron chain reaction. The cooling water is then passed throughout the remainder of the length of the tube 40 and discharged through an open end 40a of the tube into the shield water 65.

Plate shield

Referring to Figs. 6 and 8, directly below the reactor 18 is an opening 89 in the bottom of tank 58 and the concrete slab 61 of rectangular shape in which is disposed a neutron and gamma radiation shield generally indicated at 90. This shield 90 comprises a plurality of horizontally disposed steel sheets or plates 91 extending entirely across the opening 89 in the concrete slab and held at their ends by means of steel end walls 92. The plates 91 are spaced apart to provide passages 93 therebetween.

Referring to Fig. 6, the shield 90 is divided into two segments, that is, an inner hot shield 94 which is treated separately from an outer cold shield indicated as 95. The inner shield 94 is cooled by light water entering through a pipe 96 into the innermost passage 93a, and passes throughout the entire length of the shield until it reaches the opposite end of the shield. The water then passes downwardly through an opening 97 in the steel plate 91a bordering the passage 93a and into the next lower passage 93b wherein the cooling water reverses its direction of flow and passes to the opposite end of the shield. The coolant then passes through opening 98 in the steel plate 91b and into the next lower passage, from which the cooling water is withdrawn at the opposite end through a discharge pipe 99.

The outer or cold shield 95 is similarly cooled by light water entering through a suitable pipe 100 and leaving through a discharge pipe 101 and circulating through the outer shield in a manner similar to that just explained for the inner shield.

By dividing the two shields in the manner just described, any radioactivity induced in the cooling water in the inner or hot shield is removed with the water discharged through the pipe 99 without contaminating the cooling water in the outer or cold shield 95. Thus, the outermost layer of the shield 90 is kept relatively free from radioactivity. Obviously the shield 90 may be divided into more than two segments.

Leakage control

The active portion 19 of the reactor 18 can be completely sealed so as to prevent leakage of heavy water except in the end walls or tube sheets 35 and 36 through which the tubes 40 pass. In order to prevent loss of heavy water due to leakage through these openings, leakage chambers 43 are provided. Thus, any heavy water leaking from the tank 20 into these leakage chambers is collected in the bottom of the chambers and is passed therefrom through pipes 110 into a header 103. Check valves 111 are provided in the pipes 110 and allow the heavy water to flow from the leakage chambers 43 into the headers 103 but serve to prevent the flow of heavy water in the opposite direction.

The light water leakage chambers 45 are provided for the purpose of receiving water passing from the water shield surrounding the reactor 18 through the openings in the tube sheets 48 and this water is collected in the bottom of the leakage chamber 45 from which it is withdrawn through a pipe 112.

Referring to Fig. 4, the light water thus withdrawn from the leakage chambers 45 through pipes 112 is collected in a sump 113 from which it is again returned to the water cooling circuit A through a pipe 114.

As shown in Fig. 6, the third chamber 44 is disposed between the inner heavy water leakage chamber 43 and the outer light water leakage chamber 45 and is referred to as the intermediate chamber. This intermediate chamber 44 is filled with helium entering the chamber through a pipe 115 and leaving through discharge pipe 116. This gas is maintained under a pressure higher than that existing in either the inner heavy water leakage chamber 43 or the outer light water leakage chamber 45 so that in the event of leakage through the tube passages in either of the tube sheets 46 or 47 the direction of flow through such leakage space is from the helium chamber to one or both of the other chambers rather than in the reverse direction. In this manner contamination of the heavy water in the leakage chamber 43 by light water vapor from the leakage chamber 45 is prevented.

Again referring to Figs. 4 and 6, the helium leaving the intermediate passage 44 through the discharge pipe 116 is passed through conventional driers indicated at 117 and then into a compressor 118 from which the helium is returned to the intermediate chambers 44 under pressure through piping 119.

Since helium is apt to leak into the outer light water leakage chamber 45, provision is made to remove this gas from the water system. Such is shown in Fig. 4 where a pipe 120 enters the sump 113 at the top above the water level therein and conveys helium gas that naturally rises to the top of the sump 113 back to the helium line 116 where the gas is passed through the driers 117 to remove any water vapor present.

Rod removal

As previously mentioned, after the system has operated for a period of time sufficient to cause a quantity of element $94^{239}$ to be produced, it may be desirable to remove at least some of the uranium rods 22 from the reactor to extract element $94^{239}$ and radioactive fission products from the uranium.

In the neutronic reactor, a neutron density variation occurs across the active portion 19 of the reactor 18; that is, the neutron concentration at the periphery is relatively small and increases to a maximum value at the center. Actually, therefore, since the rate of production is dependent upon the neutron density, the active portion of the reactor will have three-dimensional shells or shell-like regions and the concentration of element $94^{239}$ throughout any given shell or region is substantially uniform. In a reactor built in the form of a sphere, these would, of course, be in the shape of concentric spheres, that is, spherical shells, of different diameters, while one built in the shape of a cylinder would have similar zones of equal concentration but of different shapes.

This variation in concentration indicates the desirability of a systematic schedule depending upon the time of operation and the location of the uranium for removing and discharging uranium metal that has been subject to neutron bombardment. In the case of a new system, the operation would normally continue until the metal in the center portion of the reactor reaches a desired content of element $94^{239}$, at which time this metal should be removed and replaced with fresh metal. The next removal then would be from the section next adjacent to the center section of the reactor where the desired content of element $94^{239}$ is reached after further operation. The process would then proceed with the removal of metal at various times until the metal recharged at the center of the reactor has reached the desired content of element $94^{239}$. This would then be replaced and the process of progressing toward the periphery continued, with periodic return to more central areas. A removal schedule can be developed by calculation, and checked by actual experience after the system has been placed in operation.

The power output of a system, stated in terms of heat energy, refers to the total heat production for the entire active portion of the reactor. Since the heat results from fissions in the uranium, it is evident that this heat is not formed uniformly throughout the reactor but that it must vary across the active portion of the reactor with the local rate at which fissions occur and element $94^{239}$ is formed. Consequently, the relative values for the production of $94^{239}$ apply also to heat evolution; that is, the heat generated increases from a minimum at the outer surface of the reactor to a maximum at the center.

As the total weight of the radioactive fission elements is proportional to that of the $94^{239}$ at the time of fission, it might be assumed that the amount of these fission elements and of $94^{239}$ present in metal removed from the reactor are also of the same proportion. This is not true, however, as the fission elements when produced are highly radioactive and immediately start to decay, some with short half-lives and others with longer half-lives until, through loss of energy, these unstable fission elements arrive at a stable element or isotope, and no longer change. The $94^{239}$, on the other hand, is a relatively stable element when formed having a radioactive half-life of the order of $10^4$ years.

At the start of the reaction in new metal, the radioactive fission elements and the $94^{239}$ both increase in amounts. After a certain period of operation during which time the material is subjected to intense neutron bombardment, the radioactive fission elements may reach a state of equilibrium, and from that time on, the amounts of these elements remain constant as the shorter-lived fission elements are reaching a stable condition at the same rate new ones are being produced. The amounts of stable end products of fission, however, continue to increase with the increase in element $94^{239}$. Consequently, the rate of formation of the end products, that is dependent upon the location of any particular metal in the reactor and the power at which the system operates, controls the maximum radioactive fission element content regardless of the length of time the system operates. The quantity of element $94^{239}$ on the other hand, and the final and stable end products of fission, continue to increase as the operation of the system continues. The amounts of the latter present are controlled only by the location of the metal in the reactor and the time and power of operation. The original high radioactive fission elements may, therefore, vary from a substantial percentage of the weight of element $94^{239}$ present in the metal at the center of the reactor after a short period of operation to a very small percentage in metal from a position near the periphery of the reactor after an extended operating period at a given power.

It is not to be assumed, however, that the fact that equilibrium can be obtained between the original highly radioactive fission elements and the stable fission end products, that all radioactivity will cease when the original fission elements have been permitted to decay for a time equal to the equilibrium period, for example. Many of the original fission elements have long half-lives which, together with their successive radioactive disintegration products existing long after the fission elements having the shorter half-lives have decayed, renders the uranium still radioactive, especially after prolonged bombardment at high neutron densities. In addition, the successive radioactive disintegration products of the original shorter-lived fission elements may still be present.

The equilibrium radioactivity is so intense that metal taken from the reactor for the recovery of element $94^{239}$ and fission products immediately after bombardment at high neutron densities, will heat spontaneously due to the intense radioactivity of the shorter-lived fission elements. The amount of heat given off as a result of the spontaneous heating will depend particularly on three factors:

(1) The concentration of element $94^{239}$ and fission elements in the metal; (2) The period of time of continuous operation required to reach this concentration; and (3) The elapsed time since the reactor was shut down and the metal was removed.

The metal from the center of the reactor in a system operating at a high power output, for example, at a $94^{239}$ concentration of 1 to 2000, if not cooled, might increase in temperature at the rate of about 2000° C. per hour, one day after the neutron activity of the system has been shut down. After 30 days shutdown after operating for 100 days at an output of 50,000 kilowatts, the average temperature rise is approximately 126° C. per hour. Uranium metal of the type used in chain reacting systems melts at about 1100° C.

Under these conditions, uranium metal bombarded with neutrons for an extended period of time at high rates of power output can only be safely removed from the reactor under the following procedures:

A. The neutron activity of the system is shut down, and the uranium metal is kept in the reactor and continuously cooled until the radioactivity decays to a point where the metal can be removed without melting in ambient air. This procedure may require that the metal remain in the reactor for a period of from 30 to 50 days after the neutron bombardment has ceased;

B. The neutron activity of the system is shut down and the metal is kept in the reactor with the cooling system in operation for only a few days to permit the most violent radioactivity to subside and then the metal is removed from the reactor with the cooling discontinued during the removal, except for cooling by the atmosphere or by air or water spray. The metal is then promptly placed under more efficient cooling conditions before the temperature of the metal has had sufficient time to reach the melting point of uranium; or C. The neutron activity of the system is shut down and the uranium metal is removed under continuous and effective cooling such as is disclosed in the preferred embodiment of the present invention, wherein the uranium is discharged directly into the shield water 65.

Obviously, methods A and B can be performed with all the embodiments of the invention shown, while method C can be performed with the preferred embodiment shown, for example, in Fig. 6.

It is important, of course, from a point of view of biological safety, that adequate shielding be provided to absorb the strong gamma radiations from the fission elements present in the active uranium while being removed from the reactor. The neutron activity in the system ceases within 30 minutes after shutdown, during which period delayed neutrons are being emitted from fission fragments. In no case, then, should the uranium be discharged from the reactor immediately after shutdown of the reactor but sufficient time will be given to permit all delayed neutrons to be emitted. Thus the shielding during the removal of uranium is provided primarily to protect personnel from gamma radiations.

While the methods of extracting the fission products and the $94^{239}$ from the bombarded uranium metal taken from the reactor form no part of the present invention, the fission products and element $94^{239}$ are removable and when removed are extremely useful. The radioactive fission products are valuable for use as radiation sources, many having high energy gamma radiations with long half-lives, sufficient for radiography of even heavy metal castings. In addition, some of the fission products are useful as radioactive tracers in biological and physiological research, and are in demand for these purposes.

Element $94^{239}$ is very useful, as it is fissionable by slow neutrons in the same manner as the uranium isotope $92^{235}$ contained in natural uranium. The separation of $92^{235}$ from $92^{238}$ in natural uranium is extremely difficult since both are isotopes of the same element. Element $94^{239}$, on the other hand, is a different element from uranium, having different chemical properties than uranium, and therefore can be separated from the uranium by employment of chemical processes. After separation, element $94^{239}$ can be added to natural uranium to supplement the $92^{235}$ content, thus increasing the amount of fissionable material in the uranium. This enriched uranium can then be used in chain reacting system making it possible to provide more neutron absorbing cooling facilities, for example, than could be used in a system of similar geometry employing only natural uranium. Thus, an enriched system may provide a greater power output than would be possible in a natural uranium system of the same geometry.

Referring to Figs. 12 and 13, an arrangement is shown whereby the uranium rods 22 are made accessible from a position outside the concrete wall 62 to effect this removal. Each of the aluminum tubes 40 terminates at a position near the ring header 80. On the end of each tube is threaded a valve housing member 126. On the opposite end of the valve housing 126 is threaded a tube section 127 on the end of which is threaded a packing gland 128 on the opposite end of which is threaded a length of tubing or tube section 129. This tube section 129 is threaded on its free end to receive a cap 130 that in turn is provided with a gasket 131 operating against the end face of the tube section 129 to seal the tube from the atmosphere. The distance from the packing gland 128 to the valve housing 126 is at least sufficient to receive therebetween a uranium rod 22. The packing gland 128 is provided with a resilient packing ring 132.

The valve housing 126 has an upstanding boss 133 adapted to receive a slidable valve member 134 with a valve stem 135. This valve stem 135 projects beyond the top of boss 133 and is threaded on its free end to receive a beveled gear 136 that is supported on the top of the boss 133 and is adapted to rotate about the valve stem 135, causing the stem to feed upwardly or downwardly by virtue of the screw threads, thereby raising or lowering the valve member 134. An angular bracket 137 is supported on the upstanding boss 133 and is provided with a flange 138 that supports one end of a horizontally disposed shaft 139. The other end of this shaft 139 is journaled in a bracket member 140 that in turn is fastened to the top face of the tube section 129. The shaft 139 projects through the journal on the bracket 140 and is provided with a hand crank or wheel 141 at its free end. At the opposite end of the shaft 139 is a beveled gear 142 adapted to mesh with the first-mentioned beveled gear 136, thus imparting a vertical sliding motion to valve member 134. During normal operation of the system, when the uranium rods 22 are in place in the reactor and the chain reaction is occurring, valve member 134 is disposed in its closed position shown in the upper tube of Fig. 12.

The light water flows through the tubes 40 at a rather high rate of speed so that some means should be provided for holding the uranium rods 22 in place in the reactor to prevent the force of the cooling water from moving the rods toward the discharge ends of the tubes. For this purpose, as shown in Figs. 12 and 15 to 18 inclusive, each uranium rod 22 is held in place in the reactor by means of a dummy rod 69 cooperating with a perforated holding plate 70. As shown in Figs. 12, 15 and 16, the holding plate 70 is disposed vertically at the open ends of a vertical row of tubes 40 and is slidable vertically within guide strips 71. Each guide strip 71 is more or less Z-shaped in cross section and is provided with a flange 71a for fastening the strip at the end wall 48 of the reactor 18 at the discharge ends of the tubes 40. The guide strips 71 may be welded or otherwise suitably secured to the end wall 48.

The holding plate 70, as best shown in Fig. 15, is provided with two types of spaced perforations 72 and 73, the former constituting circular holes and the latter being in the form of spaced, substantially semi-circular openings separated by an intermediate bridging member 74 integral with the plate 70.

A manipulation rod 75 is fastened to each holding plate 70 and extends upwardly to a position at the top of the shield water 65. Thus, each holding plate 70 may be moved independently in a vertical direction so as to place either the circular holes 72 opposite the ends of each of the corresponding tubes 40 or to place the semi-circular openings 73 opposite the ends of said tubes. The circular holes 72 have a diameter at least equal to, although preferably slightly greater than, the inner diameter of the tubes 40. Thus, when the circular openings 72 are disposed opposite to the open ends of tube 40, the passage from the tubes into the shield water 65 is completely unobstructed. The semi-circular openings 73 have an outer diameter approximately equal to the inner diameter of the tubes 40 so that when these semi-circular openings 73 are disposed opposite to the open ends of the tubes 40, the passages from the tubes to the shield water 65 is restricted by the bridging member 74. The semi-circular openings 73 are of sufficient width to accommodate the normal flow of cooling water passing through the tubes 40 during the operation of the system at its maximum production output. Thus, these semi-circular openings in no way restrict the intended output of the system.

Referring to Fig. 17, the dummy rod 69 may be a flat plate twisted to provide flutes 76 disposed in the form of helix about the rod. Thus, helical channels 77 are provided between adjacent flutes 76 so as to provide a continuous helical passage for the flow of cooling water from one end of the dummy rod 69 to the other. Referring to Fig. 12, the dummy rod or plug 69 is disposed between one end of the uranium rod 22 and the holding plate 70.

After the system has operated for a period of thirty or more days at a relatively higher power output, as for example 50,000 kilowatts, the temperature of the system is in a state of equilibrium. If it is desired to remove some or all of the uranium rods in the reactor following the operation of the system for this period of time, the neutron reaction in the system must first be shutdown (as hereinafter described) by inserting the safety or control rods 168 all the way into the active portion of the reactor or by discharging the heavy water from the reactor into the sump 164. The operation of the cooling system is continued, however. Assuming that the system has been operating continuously over this period of time, the decline of heat generated in the active portion of the system immediately following the discontinuance of the chain reaction is approximately 85 per cent of the heat being generated while the system was in operation. In other words, immediately after the reproduction ratio of the system is reduced below unity, the heat generation rate assumes a value approximately equal to 15 per cent of the heat generation rate existing prior to the reduction in the reproduction ratio. Approximately one second after the reproduction ratio is reduced to a value below unity, the heat generation rate has been reduced to approximately 10 per cent of the original value. One minute after the original shutdown of the system, the heat generation rate has been reduced to approximately 4.2 per cent of the original rate, and one hour following the original shutdown the heat generation rate has been reduced to approximately 1.8 per cent of the original rate.

Directly following the shutdown of the system and for a period of approximately thirty minutes thereafter, there are fissions continuing in the active portion of the reactor due to the release of delayed neutrons. Some of the heat generated during this thirty-minute period following the shutting down of the system is due to these delayed neutrons. The remainder of the heat being generated during this period is due to the radioactive decay of the fission products produced during the operation of the system. The delayed neutrons disappear within approximately thirty minutes following the shutdown of the system so that the heat generated after this thirty-minute period is caused by the decay of the radioactive fission products.

It is thus seen that the required amount of cooling after the operation of the system has been shutdown is much less than that needed before shutdown, so that it is possible immediately following the insertion of the control rods 168 or the discharge of the heavy water from the reactor tank 20 to reduce the rate of flow of light water through the cooling tubes 40 by a substantial amount. Thus, it is possible immediately following the shutting down of the system to decrease the rate of flow of the cooling water through the tubes 40 to a rate approximately 25 per cent, more or less, of that originally required during normal operation.

At this decreased rate of flow, there is no further need for holding the uranium rods 22 in place in the reactor against the water pressure so that the holding plates 70 may be moved from their normal position, wherein the bridge-like members 74 obstruct the open ends of the tubes 40, to their open position wherein the circular openings 72 are disposed opposite to the open ends of tube 40, thereby entirely removing all obstructions from the open ends of the tubes 40. It is thus possible under these conditions to remove the dummy plugs 69 and the uranium rods 22 from the reactor by merely applying force on the uranium rods 22 to force them towards the open ends of the tubes 40.

When removing a rod 22 from the reactor, a plunger 144 is employed as shown in Fig. 12 in the lower tube 40. This plunger is inserted in the tube at a time when the movable valve 134 is in its closed position because the cooling water is still being used in the tubes 40 although at a reduced rate of flow. The end cap 130 is removed and a packing gland 145 is threaded onto the free end of the tube section 129. This gland is provided with a packing ring 146 through which the plunger 144 operates. The inner diameters of the packing rings 146 and 132 are such as to provide a tight fit about the plunger 144, thereby reducing to a minimum the leakage of water past these glands. A suction pump, not shown, is normally in operation to withdraw through a tube 147 any cooling water inside the tube section 129.

With the arrangement shown it is possible to remove the uranium rods 22 and to replace them with fresh rods without halting the operation of the system for more than a few hours. This is made possible in the present device because the discharge of the uranium rods is effected under a sufficient thickness of water to effectively reduce to safe limits the neutron and gamma radiations outside the shield, and also cooling of the uranium is continued throughout the removal operations and the uranium is maintained under water. Referring to Fig. 12, a uranium rod 22 which is in its normal position, shown in the upper tube of the figure, is removed by the use of a plunger 144. While the sliding valve member 134 is in its closed position as shown, the end cap 130 is removed. The packing gland 145 is threaded onto the end of tube section 129 and the plunger 144 is passed through both glands 145 and 128 so as effectively to seal the end of the tube. The sliding valve member 134 is then raised by rotating the wheel 141 until the sliding valve 134 is in its elevated position shown in the lower tube of Fig. 12 and then the plunger 14 is moved through the tube 40 until it engages the uranium rod 22.

Force is then applied against a uranium rod 22 to move the rod toward the open end of the tube 40. A basket, not shown, may first be disposed adjacent to the discharge end of the tube 40 to receive the dummy plug 69 that is first ejected. A shielded coffin, generally indicated at 148 in Figs. 5, 6 and 7, is then placed in position adjacent to the discharge end of the tube 40 to receive the uranium rod 22 and the plunger 144, then pushes rod 22 into the waiting coffin 148. While the plunger 144 is in a position wherein the packing rings 146 and 132 cannot limit the leakage of water, there may be some leakage into the tube section 129. This water however is withdrawn from the tube section 129 through the pipe 147, as previously explained, so that there is no leakage of water past the packing gland 145.

The coffin 148 (Fig. 14), as shown, is rectangular in shape (see Figs. 7 and 14) and comprises a bottom portion 149 and a lid 150. The bottom 149 includes a steel shell 151 lined with lead 152 to a substantial thickness. The cover likewise comprises a steel shell 151a lined with lead 152a. The lead lining in the bottom 149 and the cover 150 is stepped at 153 and 153a respectively throughout the periphery of the open side of each so as to provide a tortuous path for any radio-active radiations passing from inside the closed coffin toward the outside. Such radiations are absorbed in the lead and are thus prevented from escaping.

The coffin is provided with ears 154 (Figs. 6, 7 and 14) fastened to the bottom portion 149 having openings 155 (Fig. 7). By means of grab hooks 156 on the end of cables 157 (Fig. 6) the coffin can be handled conveniently from overhead by means of a crane, not shown, located above shield water 65.

The lid 150 of the coffin is provided with eyelets 158 to facilitate handling with conventional hooks and cables shown in Figs. 5 and 6.

During removal of a uranium rod 22 from the reactor, the bottom portion 149 of the coffin is disposed at the discharge end of the reactor as shown in Fig. 6 directly opposite to and below the end of the tube 40 from which the rod 22 is to be discharged. The rod thus discharged is received by the bottom portion of the coffin, and after the coffin has been filled, as shown in Fig. 14, the lid 150 is moved into place on the bottom portion 149.

At the time the active uranium rods are placed in the coffin 148, they are disposed under water and are thus cooled and shielded. After the coffin is filled, it is raised to the top of the shield water 65 and removed to an aging pit, not shown, and placed under water where the radioactive decay continues. Means for cooling the rods must be provided during this removal, and for present purposes, since the coffin, per se, forms no part of the invention, it will suffice to say that the cooling can be effected by circulating cooling water through the coffin from an outside water supply in any well known manner.

The actual separation of element $94^{239}$ and radioactive fission products from the uranium is not started until the radioactivity of the fission products has decayed to limits wherein the material can be handled with the exercise of practical safety precautions.

Heavy water discharge

Extending downwardly from the active portion 19 of the reactor 18 are a plurality of heavy water discharge pipes 102 which project through the shield 99 and terminate in a heavy water discharge header 103 (Figs. 4, 5, and 6). A suitable gate valve 160 is disposed in each pipe 102 and is operatively connected to an operating rod 161 by a suitable arm 162. As shown, all of the valves 160 connected to the rod 161 open or close simultaneously by manipulation of the rod 161.

Normally valves 160 are closed and the level of the heavy water in the tank 20 is such that the overall size of the uranium-heavy water mass is slightyl greater than the critical size for the specific geometry and purity of the system. Thus, the reproduction ratio for the active portion of the reactor is slightly greater than unity (about 1.005) so that a controlled exponential rise in the neutron density can be effected in the system. In the event of some emergency, the gate valves 160 are opened to stop the chain reaction rapidly, as will be explained presently when the details of an emergency control circuit are described.

The discharge header 103 empties into a main discharge pipe 163 which in turn empties its contents into a sump 164 (Fig. 4). This sump 164 is of sufficient size to receive all of the heavy water in the system.

Extending off from one of the discharge pipes 102 is a level control pipe 165 projecting downwardly into the sump 164 and terminating close to the bottom of the sump. A two-way operating pump 166 driven by a reversible motor 167 is provided in the level control pipe 165. The purpose of this level control pipe 165 is to convey heavy water back and forth between the sump 164 and the active portion 19 of the reactor 18 in response to the action of the pump 166 so as to control the level of the heavy water in the tank 20. This may be done in conjunction with an electrical control circuit as will be brought out hereinafter.

Heavy water circuit

A heavy water system of the type disclosed herein is temperature stable. By that is meant that as the neutron density in the reactor increases exponentially at a controlled rate, the temperature of the uranium and the heavy water rises as a result thereof. This rise in temperature of the heavy water causes expansion of this moderator effectively lowering its density and hence the reproduction ratio of the system. This results in a decrease in the neutron density that in turn lowers the rate of heat generation. Thus the temperature of the heavy water is lowered and its density again becomes greater, resulting in a rise in the reproduction ratio of the system. In this manner, the cycle repeats itself and the control of the reaction is automatic, within short limits.

Additional control means may be provided, however, to insure adequate control. One of said means consists of one or more safety rods 168 comprising a material of high neutron absorbing characteristics such as cadmium. This rod per se forms no part of the present invention so a detailed description is believed unnecessary. It will be sufficient to explain that this rod can be moved in and out of the active portion of the reactor and is maintained at a selected position in the reactor to absorb sufficient neutrons to stabilize the chain reaction. If a thin sheet of cadmium is used as the absorbing material in the control rod, only thermal neutrons will be absorbed, the fast neutrons being capable of penetrating the material. Thus, long lived radioactivity in the control rod resulting from fast neutron absorption is prevented. The control rod or rods may be operated manually or by some electrical circuit. An operative circuit will be brought out hereinafter.

The heavy water discharge header 103 and valve mechanism associated with the discharging of the heavy water from the reactor must be readily accessible for maintenance purposes. As shown in Figs. 5, 6 and 8, a tunnel 175 is provided underneath the light water shield 60. A lead plate 176 forms the ceiling for the tunnel and supplements the concrete slab 61 in absorbing neutrons and gamma rays. Concrete walls 177 and floor 178 complete the walls of the tunnel 175. The entrance to the tunnel may be adjacent to the outer face of the concrete wall 62 of the light water shield 60. The steel and light water shield 90 serves as protection against dangerous exposures to neutrons and radioactive radiations directly under the active portion of the reactor 18.

Helium system

The heavy water in the reactor tank 20 does not completely fill the tank, the space above the level of the heavy water constituting a vapor and gas space. It is desirable that this space also be filled with helium under pressure that is preferably circulated outside the reactor tank 20, so as to remove heavy water vapor and gases accumulating in this vapor space above the heavy water. Helium being an inert gas prevents an explosive mixture from forming above the heavy water level.

Under the effect of the dense neutrons in the reactor, the deuterium and the oxygen in the heavy water become dissociated and bubble through the moderator in the form of gases that collect in the vapor space above the heavy water. These gas bubbles reduce the effective density of the heavy water and hence lower the efficiency of the moderator as a neutron slowing agent thus lowering somewhat the reproduction ratio. These two gases are removed from the vapor space along with the helium.

This decomposition takes place in any type of heavy water system, and is particularly prevalent in the so-called "slurry system" shown in Fig. 3 where the uranium is in the form of small particles held in suspension in the heavy water. The primary energies released as the result of fissions in the uranium particles in the case of the slurry system leave the uranium bodies and are spent in the heavy water. The decomposition of the deuterium and the oxygen as a result of these primary energies is much greater than that caused by the bombardment of the heavy water nuclei by neutrons.

In the uranium rod system disclosed herein, the uranium bodies are so large and are so well enclosed in aluminum that the fission fragments cannot leave the uranium bodies. Thus, these primary energies are spent by being converted into heat in the uranium bodies so that the decomposition in such a system is caused primarily by the bombardment of the heavy water nuclei with neutrons. There is sufficient decomposition, however, even in the present system to require some means for recombining the deuterium and the oxygen. For example, in a 50,000 kw. plant with a tank having a volume of 10 cubic meters, gas is liberated from the moderator at the rate of about 10 liters per second. This is equivalent on the average to about $10^{-3}$ cm.$^3$ of gas per second per cm.$^3$ of active portion of the chain reacting system which results in a reduction in water density of about 0.8%. An increase of about 1.7% of material required in the active portion of the reactor is needed to compensate for this water density reduction.

Referring to Fig. 4, a pipe 179 conveys the helium together with the heavy water vapor and uncombined gases from the vapor space above the heavy water in the reactor tank 20 to a combiner and condenser 180 located entirely outside the shield 60. This combiner, per se, forms no part of the present invention but includes a hot grid or the like, not shown, against which the uncombined gases, deuterium and oxygen are directed for recombination and condensing into deuterium oxide. The heavy water thus formed is directed into the sump 164 through a pipe 181. The helium gas serving to wash the dissociated gases out of the reactor tank 20 leaves the combiner 180 through a pipe 182 and enters a purifier 183 where it is purified and separated from non-condensible gases, and then passes through a pipe 184 and into a compressor 185 where the helium is compressed and is then returned through a pipe 186 to the vapor space above the heavy water in the reactor tank 20. The non-condensible gases in the purifier 183 are exhausted through a suitable pipe 187.

It is to be understood, of course, that all of the equipment shown in Figure 4 outside of the shield 60 must be suitably shielded either by being disposed below ground or by some other appropriate means to protect the personnel in the vicinity from the harmful radiations.

Controls

The device above described is ideally adapted for automatic control to maintain the neutron density within the reactor substantially constant, and thus give a substantially constant rate of production of element 94$^{239}$. Due to the fact that large masses of material are utilized in the active portion of the reactor, there is a temperature lag therein. Consequently, it is convenient to monitor and control the structure by means of ionization chambers, or equivalent devices that will respond to the neutron density at the periphery of the active portion of the reactor. As the rate of neutron diffusion out of a chain reacting system is always proportional to the rate of generation of neutrons within the structure, the ionization chambers can readily be placed at the periphery of the active portion of the reactor, and in fact are preferably so positioned that they may not be subjected to the extremely high neutron density existing within the reactor.

There are disclosed herein two means for normally controlling the chain reaction. The control rod 168 (Fig. 19) may be used alone or with other control rods. The chain reaction may also be controlled either without any other control means or in conjunction with the control rod 168 by means of varying the level of the heavy water in the active portion 19 of the reactor 18. This latter control is effected by means of the reversible pump 166 that selectively draws heavy water from the reactor tank 20 and discharges it into the sump 164, or conversely, pumps water from the sump 164, and discharges it into the reactor tank 20, in both instances passing the water through the level control pipe 165. Either one or both of these devices may constitute the normal control for the system.

Before proceeding to a detailed description of a control circuit that may be utilized in controlling the neutron chain reaction, it is desirable to point out the manner in which the control rods operate to regulate the neutron density. In any self-sustaining chain reacting structure adapted to produce power or element 94$^{239}$, the attainable neutron reproduction ratio of the system must be capable of being made greater than unity. For any value over unity, the chain reaction becomes self-sustaining and the neutron density, without control, would increase exponentially in point of time, until the device is destroyed. For proper control, the system must be held in balance by maintaining the neutronic reaction at some point where the production of new neutrons is balanced with the neutrons initiating the chain. Under these conditions, the active portion of the reactor will continue to maintain the neutron density therein that obtained when the system was balanced.

However, in order to enable the reactor to reach a desired neutron density, the system must be permitted to rise in neutron density for a period of time until the desired density is reached. It is necessary thereafter only to hold the system in balance.

Inasmuch as the reproduction ratio in any self-sustaining chain reacting system is reduced by the presence of impurities that absorb neutrons, such impurities can be introduced in the active portion of the structure in the form of a control rod that can be of a material such as boron or cadmium capable of absorbing large amounts of neutrons. The depth to which this control rod penetrates into the active portion of the structure will determine the amount of neutron absorption and, therefore, the reproduction ratio of the system. A range can be obtained between a condition providing a neutron reproduction ratio that is greater than unity and a condition at which no chain reaction can be maintained. The exponential rise in neutron density can be made relatively fast or relatively slow in accordance with whether the reproduction ratio is permitted to be much greater than unity or only slightly greater than unity.

There is a small percentage of delayed neutrons emitted in the fission process. These delayed neutrons cause the neutron density to rise in a finite time rather than instantaneously. The time required for doubling the neutron density increases as the reproduction ratio approaches unity, and any desired rate of rise in neutron density can be obtained.

As a general rule, the reproduction ratio of a neutronic system with all control rods withdrawn should not be greater than about 1.005. At this value the neutron density in the system will double itself every seven or eight seconds and can easily be controlled. Thus at no time will the heavy water level in the reactor tank 20 be permitted to exceed that corresponding to a reproduction ratio of about 1.005.

If the control rods 168 are used alone to control the neutron chain reaction then one method of control would be to withdraw the control rods from the active portion of the reactor to a point where there is an exponential and preferably slow rise in neutron density within the structure. When a desired neutron density has been reached, the control rod is then returned into the active portion of the reactor to a point where the reaction is balanced. This balance is then maintained so as to keep a constant power output or production output of element 94$^{239}$ in the reactor. The maintenance of the balance point with the control rod would be relatively simple were it not for the fact that changes in temperature in the reactor result in changes in the reproduction ratio. It is desirable, therefore, that the control rod be so manipulated that a substantially constant neutron density within the system is maintained. Such a method of control may be accomplished by automatic connection of the control rods with an ionization chamber or similar device responding to neutron density and positioned within the reactor close to the active portion thereof.

Furthermore, due to the exponential rise of neutron density within the active portion of the structure when the reproduction ratio is greater than unity, all possible precautions must be taken to prevent a continued exponential rise in neutron density in case of failure of the control rod to return to the balance position.

While there are many means by which the control rod can be operated, it is believed sufficient to illustrate and describe one simplified control circuit to the end that fully equivalent circuits will be made apparent to those skilled in the art.

Referring to Fig. 19 which shows diagrammatically and reduced to lowest terms one form of control circuit that might be used for regulating by means of control rods the output of the plant hereinbefore described, attention is focused first on the control circuit shown at A. A control ionization chamber 200 is placed in the graphite 42 surrounding the active portion 19 of the reactor 20 and is filled with boron fluoride. A central electrode 201 is provided within the chamber 200, and is connected to a wire 202 leading outside the reactor to a movable contact 203 on a resistor 205. The resistor 295 is connected across a relay coil 206, one side of which coil is connected to a battery 207, the other side of which is connected to a shield 209 around the wire 202. The shield 209 is grounded as is the chamber 200.

Alpha ray ionization due to neutron reaction with the boron within the chamber 200 is proportional to the neutron density in the region of the ionization chamber 200. Thus, the current in the resistor 205 is varied in accordance with neutron densities reaching the ionization chamber 200.

The relay coil 206 operates a relay armature 210 which is spring biased by a conventional spring 211 to contact one motor contact 213, and is urged by the electromagnetic attraction of the relay coil 206, in response to a sufficient current passing through the relay 206, to contact a second motor contact 215. Contacts 213 and 215 connect to the outside of a split winding in motor 221, the center connection 222 being connected through power mains 225 to the armature 210.

The motor 221 rotates a shaft 239 having on one end thereof a pulley 231 and on the other end thereof a control rod gear 234. The shaft 230 between the motor 231 and the gear 234 is split and an electromagnetic clutch 232 connects the two split portions of the shaft 230 when the magnetic clutch 232 is energized. The control rod gear 234 meshes with a rack 168a on the control rod 168.

The pulley 231 has a cable 240 wound thereon which in turn is connected to a counterweight 241 so that the weight of the control rod 168 is substantially balanced by the counterweight 241 so as to permit the motor 221 to run easily in either direction.

During normal operation of the system where the neutronic reaction is controlled only by control rods 168, the slider 203 on the resistor 205, having previously been calibrated in terms of neutron density, is moved to the density position at which it is desired the reactor to operate, taking into account the difference in neutron density at the center of the active portion of the reactor, and at the periphery thereof during the operation. This difference is a constant ratio at various operative densities. When the reproduction ratio in the reactor is less than unity, as is the case when the control rods 168 are disposed at a sufficient distance in the active portion of the reactor, a neutron density at the position of the ionization chamber 200 is much lower than that required to energize the relay coil 206 sufficiently to overcome the action of spring 211 so as to move the armature 210 away from motor contact 213. Thus, the motor 221 under these conditions is energized to withdraw the control rods 168 from the active portion of the reactor to a point determined by a limit stop 242 where the reproduction ratio of the reactor is just sufficiently greater than unity to permit a slow rise in neutron density in the reactor. The motor 221 will stall when the rods 168 are at the stop 242, and should be of the type permitting stalling for a sufficient time to allow the next succeeding operations to be effected. The reaction at this position of the control rod becomes self-sustaining and the neutron density rises. In consequence, the ionization taking place within the ionization chamber 200 rises. As the ionization increases, the current passing through relay coil 206 also increases until a predetermined field intensity is reached. When the induced magnetism in the relay coil 206 has reached a predetermined strength the effect of the spring 211 is overcome and the armature 210 is attracted to the adjacent pole of the relay 206 thus connecting the armature 210 to the motor contact 215. This energizes the motor 221 so as to operate in the reverse direction to that of original operation, so as to drive control rods 168 downwardly into the active portion of the reactor thereby causing the neutron density in the reactor to decay. As soon as the neutron density decays to a predetermined lower value that is approximately at or slightly below that corresponding to a reproduction ratio of unity, the magnetic strength of the relay coil 206 becomes weakened to the extent that the spring 211 again acts to move the armature 210 against the contact 213. The control rods 168 will thus hunt between a point above the balance position where the neutron density decays, thus providing an average neutron density within the reactor as determined by the setting of slider 203 on the resistor 205. Since the mass of the reactor causes any temperature change to lag behind any neutron density change, the temperature of the reactor is maintained substantially constant. If desired, any of the well-known anti-hunting circuits may be utilized as will be apparent to those skilled in the art.

The main purpose of the control circuit A is to regulate the control rods 168 to balance the neutron density in the active portion of the reactor so as to maintain any desired average temperature within the reactor.

Instead of employing control rods for monitoring the system, it may be desirable to vary the level of the heavy water in the reactor tank 20 as previously suggested. A system of the present type lends itself particularly well to this type of control because of the case by which the liquid moderator can be pumped in and out of the active portion of the reactor.

Referring again to Fig. 19, a simplified circuit effecting such a control is generally shown at B. The various parts making up this circuit are practically the same as those employed in circuit A, and for the sake of convenience similar reference characters are employed for corresponding positions of the circuit except that the values of the reference characters have been increased by a factor of 100. Thus, the control ionization chamber is shown at 300, the central electrode at 301, the conductor 302 is shown connecting the central electrode 301 to the movable contact slider 303 operating along resistor 305. A relay coil is shown at 306 in a circuit with battery 307 suitably grounded and connected to the shield 309. An armature 310 is normally urged away from the relay coil 306 by a tension spring 311 to engage a contactor 313. Upon energization of the relay coil 306, the armature 310 is attracted to the pole of the relay coil 306 so as to break the circuit through the contact 313, and to complete the circuit through contact 315. Contacts 313 and 315 are connected to the outside of a split winding of motor 321, the central connection 322 of which is connected through power mains 225 to the armature 310. The motor 321 drives the reversible pump 166 through a shaft 330.

Having described the circuit for controlling the level of the heavy water in the reactor tank 20, we shall now describe its operation, considering the control rods 168 withdrawn from the system and having no effect on its operation. The slider 303 on the resistor 305 having previously been calibrated in terms of neutron density is moved as previously explained on the slider 303 to the density position at which it is desired the reactor to operate, again taking into account the difference in neutron density at the center of the reactor tank 20 and at the periphery thereof during operation.

For this description, it is assumed that the level of the heavy water in the reactor tank 20 is below the critical level at which the reproduction ratio for the system is equivalent to unity. In other words, it is assumed that the level of the moderator in the tank 20 is such that the effective overall size of the moderator with the uranium contained therein is less than the critical size at which the reproduction ratio is equivalent to unity. Thus, the chain reaction is not self-sustaining and in order to place the system in operation it is necessary to increase the effective overall size of the active portion 19 of the reactor 18 above the critical size so as to raise the value of the reproduction ratio to slightly above unity. A manual switch 322a is first closed so as to complete the circuit to the motor 321. Since the reproduction ratio of the system is less than unity, the neutron density in the reactor is below that required to energize the relay 306 sufficiently to open the circuit through contact 313. Thus, as soon as the manual switch 322a is closed, the motor 321 operates to pump heavy water from the sump 164 into the reactor tank 20. The heavy water level thereby rises in the reactor tank 20, increasing the effective amount of uranium and moderator and thus increasing the overall effective size of the active part of the reactor. As soon as the heavy water in the reactor tank 20 reaches a level slightly greater than that corresponding to the critical size of the system, the relay 306 responding to the ionization chamber 300 becomes energized sufficiently to move the armature 310 away from the contact 313 and into engagement with contact 315. The motor 321 is thus operated in the reverse direction to return some of the heavy water from the reactor tank 20 to sump 164, thereby again reducing the effective overall size of the neutronic system and hence lowering the reproduction ratio. This reduction will continue until the reproduction ratio corresponds approximately to or is a little less than unity. Thereafter the level of the heavy water in the reactor 20 hunts between positions corresponding to overall effective sizes slightly in excess and slightly less than the critical size.

*Emergency control*

In the event of emergency, or for other reasons, it may be desirable to discontinue the operation of the system. This may be done by rapidly driving into the active portion of the reactor a plurality of safety rods that may be similar to the control rods 168. These rods in order to serve their intended function must absorb a sufficient number of neutrons to lower the reproduction ratio of the system below unity.

For present purposes, the control rod 168 may also represent a safety rod. It is to be understood, of course, that separate rods may be used. This rod may be driven into the reactor in response to excessive neutron densities in the reactor, or it may respond either separately or additionally to temperature or flow conditions of the light water passing through the cooling system.

As shown in Fig. 19, the rods 168 respond to a flow switch 331 disposed in the light water cooling pipe 24 near the inlet ends of the tubes 40. The electric circuit for accomplishing this is shown at C.

In this circuit, the flow switch is connected to one side of power mains 225 by a conductor including a normally closed circuit breaker 333 adapted to be manually operated. The other side of the flow switch is connected to the magnetic clutch 232 and thence to the power main 225. As long as the proper amount of water is passing through the pipe 24, the flow switch 331 maintains a closed circuit through the magnetic clutch 232 so that the control rods 168 operate in response to circuit A to stabilize the chain reaction. If, for any reason, the power source for the power mains 225 should fail, or if the flow of water past the flow switch 331 should stop or diminish below a predetermined rate to break the circuit through the flow switch 331, then the magnetic clutch 232 becomes de-energized so as to free the gear 234 from the counterweight 241, thereby allowing rod 168 to drop by gravity into the active portion of the reactor. There is a sufficient number of rods 168 to thus stop the chain reaction.

Since the moderator disclosed herein is in liquid form, a very effective emergency control for the present system is to withdraw rapidly from the active portion of the reactor the heavy water moderator to reduce the overall size of the active part of the reactor below the critical size thereby stopping the chain reaction. The pressure of the helium on the upper surface of the heavy water aids in discharging the heavy water from the reactor. This discharge is accomplished in response to neutron densities in the reactor, the circuit for this control being shown at D in Fig. 19.

Circuit D is similar to circuits A and B and again for the sake of simplicity similar reference characters for parts corresponding to those in circuit A are used but they are increased by two hundred.

An ionization chamber 400 controls the circuit and varies the current flowing through the relay coil 406. An armature 410 is normally held against contact 413 by spring 411 and is connected on its other end to an electromagnetic relay coil 334, which in turn is connected at its other end to the power line 225 through a normally closed circuit breaker 335 adapted to be operated manually. An armature 336 in the form of an arm pivoted intermediate its ends at 337 is normally held against the pole of the relay coil 334, as shown, on the opposite side of the fulcrum 337 from the relay coil 334 and a weight 338 is adapted to pivot the armature 336 in a counterclockwise direction about the fulcrum 337 when the attraction of the relay coil 334 ceases. A hand grab 339 also is provided for effecting this counterclockwise motion.

Attached to the end of the operating arm 161 is a cable 340 passing over a pulley wheel 341 and having a weight 342 attached to its free end. A rack 343 is fastened to the operating arm 161 and cooperates with a pawl 344, fastened to the armature 336, to hold the operating arm 161 so as to maintain the gate valves 160 closed. Upon removal of the pawl 344 from engagement with the rack 343, the operating arm 161 is released and is moved by the falling weight 342 to open the valves 160 so as to discharge the heavy water from the active part 19 of the reactor 18 into the sump 164.

Normally the armature 336 is disposed as shown in Fig. 19 in the position maintaining the gate valves 160 closed. This is accomplished by maintaining the electromagnetic relay coil 334 energized from the power source 325 through the control circuit D. In the event that the neutron density in the reactor 18 reaches a predetermined high value the ionization chamber 400 responding to the neutron density causes the magnetic reaction of the relay coil 406 to reach a value sufficient to move the armature 410 to the pole of the magnetic relay 406. Thus, circuit D is broken at the contact 413 thereby de-energizing the electromagnetic relay coil 334 causing the armature 336 to move about its fulcrum 337 in response to the falling weight 338. This movement of the armature 336 withdraws pawl 334 from the rack 343 to release the weight 342 thereby causing the operating arm 161 to open the valves 160. The heavy water in the reactor tank 20 is thereby permitted to pass through the valves 160 and empty into the discharge header 103, and thence into the sump 164.

The initial calibration of the ionization chamber 400 is such that the relay coil 406 is energized only in the event that the neutron density in the reactor 18 reaches a value greater than that sufficient to operate either circuits A or B. In other words, circuit D operates to discharge the heavy water from the active portion of the reactor only as a last resort in the case of emergency, and only after circuits A or B have failed to operate or otherwise to prevent the neutron density in the system from rising above that required to operate circuit A or B.

Circuit D, as shown, will also function to open the discharge valves 160 in the event that there is a failure in the power mains 225. On failure of the power source, the electromagnetic coil 334 becomes de-energized thereby releasing the armature 336 to open valves 160 in the manner previously explained.

As an added precaution, a hand operated circuit breaker 335 is placed in series in the circuit D so that the heavy water can be discharged from the reactor tank 20 merely by manually opening the circuit breaker 335.

While the rods 22 are disposed inside the aluminum tubes 40, the cooling water is passed over the rods and heat is thus conveyed away in the form of sensible heat, thus causing the cooling water to increase in temperature. In the system shown herein, it is important that the cooling water is not permitted to boil for otherwise the density of the coolant in the tubes 40 will drop resulting in a rapid increase in the reproduction ratio for the system. Thus, the control is thrown out of balance and it may be difficult, if not impossible again to stabilize the reaction. Consequently, various factors such as the control of the reaction, and the rate of flow of cooling water, are preferably so regulated as to prevent the cooling water from boiling in the tubes when they are surrounded by the heavy water moderator.

Upon discharging the uranium rods from the aluminum tubes 40 into the shield water 65, the rods become immersed in a more or less stationary body of water so that boiling of the water coming in contact with the uranium rods takes place. This is advantageous because the efficiency of the cooling is enhanced by the fact that the latent heat of evaporization is utilized to remove heat from the uranium rods Thus there is no problem of cooling after the rods 22 have once been discharged from the aluminum tubes 40 into the shield water 65.

In the arrangement (Fig. 4) where the water enters the cooling system at 86 and leaves at 87, if for any reason the cooling system should fail while the active uranium rods 22 are disposed inside the active portion 19 of the reactor 18, the embodiment disclosed herein has the additional advantage of providing an automatic cooling system for removing the heat in the rods 22 generated as the result of delayed fissions and radioactive decay of fission products in the uranium so as to forestall boiling in tubes 40. As soon as the flow of cooling water through the tubes 40 ceases, the shield water 65 directed by its 40 foot head enters the open ends of the tubes 40 and passes in reverse direction through these tubes and over the active uranium rods 22 causing the shield water 65 to drain from the tank 58 through pipe 24, pump 28 and finally through pipe 86. Thus cooling of the uranium rods 22 is maintained and can be continued indefinitely assuming some means are furnished for replenishing the shield water 65 in the tank 58. This can be done by the provision of a separate water supply system, not shown, of conventional type.

Construction

When constructing the system above described, the fabrication of the reactor is important at least insofar as concerns the manner by which the heavy water is placed in the active portion of the reactor. The entire reactor shell with all of its fittings including the tubes 40 should be completely fabricated and all sealed joints made without either the uranium or the heavy water being in the reactor. The control rods, if used, should be placed into position and the proper seals made. All external circuits should be installed and placed in readiness for use.

After the system has been completely fabricated, the uranium rods can be inserted, together with their dummy rods 69. The holding plates 70 are in position to hold the rods in place in the reactor. Next after checking to be sure the valve members 134 are closed, the shield water 65 is placed in the shield and the flow of cooling water through the tubes 40 is started. Likewise, the cooling water flow through the shield 90 is started. The control rods 168 are inserted entirely into the active portion of the reactor as are any additional emergency rods that may be used. The heavy water is now pumped slowly into the reactor tank 20 by pump 166, withdrawing heavy water from the sump 164.

The amount of heavy water required to effect the critical size of the active portion of the system having been estimated, the flow of the heavy water into the tank 20 is continued slowly until this calculated amount is approached. The pumping is then stopped and the control rods 168, together with any other safety rods, are slowly withdrawn one at a time from the active portion of the reactor. Neutron density readings are then made in a well known manner, for example, by the use of a previously calibrated ionization chamber. By repeating this process a number of times while the overall size is still below the critical size, the critical size can be predicted from readings thus made by appropriate mathematical calculations. The heavy water is then pumped slowly into the reactor tank 20 until this critical size is reached. The critical size is approached with caution with the control and safety rods in place in the active portion of the reactor and many check readings are made to make certain that the size does not exceed the critical size by more than the desired amount, which, as previously mentioned, is just sufficient to provide a reproduction ratio, with the control and emergency rods removed, of slightly greater than unity, and never greater than about 1.005.

Due to the comparatively small size of the reactor, the expansion and contraction of the various members does not create a serious problem. The presence of the light water surrounding the reactor provides cooling of the metal and serves to control the expansion. The flexibility of the tube sheets forming the end walls and chamber separating walls at the ends of the reactor compensates for expansion of the tubes.

Referring to the modification shown in Figs. 20–23 and first to Fig. 20 of the drawings, numeral 501 denotes a neutronic reactor tank or container of cylindrical shape and of a material that is relatively non-corrosive at low temperatures and that is relatively non-absorbent with respect to neutrons, such as, for example, aluminum or stainless steel. A suitable size of such tank for a self-sustaining chain reaction when $D_2O$ is used as a moderator is one that is 6 feet in diameter and 7 feet 4 inches high, although other sizes may be used as well. Suspended in tank 501 are one hundred and thirty-six rods 502 of uranium metal which are 1.1 inches in diameter and are sheathed by aluminum about .035 inch thick to prevent extreme radioactivity and contamination of the $D_2O$ moderator by fission products emanating from the uranium. Such coating also prevents corrosion of the uranium by the heavy water. Rods 502, described in detail hereinafter, extend to within about ¼ inch of the tank bottom. Sufficient deuterium oxide is introduced into tank 501 to obtain a volume of uranium and heavy water slightly over the critical size. Such critical size may be predicted well in advance of attainment thereof. This is done by taking measurements of the neutron density, preferably adjacent to the perimeter of the tank, for example, in the reflector 504, described hereinafter, as the tank is being filled, and by plotting, for instance, the reciprocals of such neutron densities as ordinates against some measure of the overall size of the filled portion of the tank (e. g., the volume of $D_2O$) as abscissas, as the size is being increased by raising the level of heavy water in the tank. This will give a curve that, when extrapolated, will indicate or forecast the critical size at the point where the curve crosses the axis of abscissae. When the critical size has been exceeded a self-sustaining nuclear reaction is initiated. In the reactor described, the critical size was obtained when the tank 501 was filled to a $D_2O$ level of 122.4 centimeters from the bottom, and an operating size giving a neutron density doubling time of 37.6 seconds was obtained at a $D_2O$ level of 123.1 centimeters. At a level of 124.7 the doubling time was 6.52 seconds.

Immediately surrounding tank 501 is a neutron reflector 504 of graphite, for example, having substantially a cup shape. Reflector 504 and tank 501, together with its contents, are referred to as the neutronic reactor. The moderator and the uranium immersed in the moderator constitute what may be termed the active portion of the reactor. The thickness of the reflector 504 may be of the order of two or three feet, or more, depending on the size of the active portion and the degree of neutron scattering required. By using this peripheral layer of scattering or reflecting material, the overall size of the active portion of the reactor may be made somewhat smaller than in a case where no scattering layer is employed, since neutron losses to the exterior are effectively reduced. Tank 501 and its contents may be built slightly below the diameter that would be required without a reflector so that the addition of reflector 504 with its neutron reflecting action will convert the reactor from one that is not self-sustaining to one that is self-sustaining.

A concrete shield 505 surrounds the graphite reflector 504 and serves to prevent neutrons and gamma radiations from escaping to the outside of the structure. The carbon in reflector 504, being a relatively light element, absorbs gamma rays only to a relatively small extent. The concrete shield may be of the order of five or ten feet in thickness. The water of crystallization in the concrete absorbs escaping neutrons.

Generally speaking, the higher the atomic weight of an element, the better it serves as a shield to prevent escape of penetrating radiations, such as gamma radiations. Lead, therefore, is an excellent material for a shield for certain purposes while water of the same thickness is only fair. However, thick water shields are sometimes convenient and satisfactory. Interposed between the concrete shield 505 and graphite reflector 504 is a cooled metal shield 507, preferably of a lead-cadmium alloy, having cooling tubes 507a passing therethrough, through which light water, that is, ordinary water, or other coolant, may be circulated. Shield 507 is especially adapted not only to cool the outside of the neutronic reactor but to minimize the escape of gamma and other penetrating radiations. A suitable thickness may be 4 inches or more.

A cover plate 508, for example, of stainless steel, is provided at the top of tank 501 and serves as a thermal shield as well as a support for rods 502 and for control and safety rods pivotally mounted thereunder, described infra. Above the cover plate 508 is a space 509 into which the upper ends of rods 502 project, and through which piping can be conducted. Above space 509 is a shield 509a having alternate layers of iron and "Masonite" brand of steam-exploded wood fiber for preventing the escape of neutrons, gamma rays, and other penetrating radiations from the top of tank 501 to the outside.

A tube or well 509b of any suitable diameter, for example 4 inches, extends through shields 509a, space 509, and plate 508 into the tank 501, preferably axially of the tank. Objects may be introduced from the exterior through the tube 509b and into the center of the tank 501 so that they may be bombarded by high intensity neutron radiations for the production of radioactive isotopes, or for other purposes desired. Aluminum is suitable for tube 509b.

A pan 515 of stainless steel or other suitable material is located at the bottom of reflector 504 for collecting any heavy water that may leak from tank 501, inasmuch as heavy water, at present, is relatively expensive. The collected heavy water is drained as indicated by the arrow A.

Helium at substantially atmospheric pressure is introduced through pipes 516 into the top of reactor tank 501, that is, above the level of the heavy water, and thence is circulated to the exterior of the tank 501 through pipes 517. As the result of high neutron densities and heat developed during the operation of the chain reaction in tank 501 some of the deuterium oxide will decompose into $D_2$ and $O_2$. These uncombined gases will collect at the top of tank 501. In order to dilute and to remove such uncombined gases, recombine and recondense them without explosive effect, a gas circulating system of any well-known type (not shown) may be used for circulating the helium together with the uncombined gases into a recombiner of any well-known type (not shown) such as a hot grid or platinum-charcoal catalyst, or both, for effecting recombination of the $D_2$ and $O_2$ into heavy water, and for returning the condensed $D_2O$ into tank 501. Helium may be circulated, for example, at the rate of 3 cubic feet per minute. A suitable ratio of $D_2$ to helium may be 1 to 150, although other dilutions may be used instead.

Space 509 also carries $D_2O$ inlet pipe 501a by which $D_2O$ can be supplied to the top of reactor tank 501. Outlet pipe 501b is positioned at the bottom of tank 501. The $D_2O$ is circulated through external heat exchangers (as heat exchangers 27a of Fig. 2) through pipes 501a and 501b to cool the moderator and thereby cool rods 502. Suitable valves and additional piping are provided to direct the heavy water to a storage tank (not shown).

Immediately below coverplate 508 there is provided a cadmium sheet 518 to act as a shield for minimizing the escape of slow neutrons. Immediately below cadmium sheet 518 there is provided an aluminum sheet 519 which is useful primarily to prevent electrolytic action between otherwise dissimilar metals (cadmium and aluminum) in the interior of tank 501.

Shield 509a is supported by two pairs of crossed I beams 520 and 521. Both pairs of I beams have their extremities supported by the concrete shield 505.

Referring to Fig. 21, numeral 502 denotes one of the composite uranium containing rods that is suspended in the deuterium oxide moderator as shown in Fig. 20. Rod 502 comprises a cylindrical rod of uranium or uranium containing material 522 six feet long that is screw-threaded into a supporting rod 523 of non-fissionable material such as, for example, aluminum. A thin tubing of aluminum 524 is drawn on to the outer surface of uranium rod 522 and supporting rod 523 by any well-known drawing process by screwing on an attachment 537 (see Fig. 22) that is subsequently removed. Thereafter, the joints formed at the top of supporting member 523 and at the bottom of rod 522 are welded so as to form an air-tight seal in tubing 524, thus protecting the uranium rod 522 from the effects of the $D_2O$. A narrow longitudinal groove 522a is provided between the connected elements 522—523 and tubing 524. An axial groove 525 and communicating radial groove 525a are provided at the top of supporting rod 523 that communicate with space 522a thereby making it possible to evacuate the air space and thereby test for possible leaks in the top and bottom welded joints in tubing 524 by noting the pressure change interiorly of the air space after a predetermined evacuation.

A ball valve 526 is provided to seal the space 522a from the atmosphere. A set screw 527 is screwed downwardly of supporting rod 523 so as to firmly seat the ball valve 526. A shank 531 is provided and supporting member 523 is screw-threaded thereto. An upwardly extending aluminum sleeve 534 is screwed to shank 531 and closed by an upper flanged member 533. A lead rod 532 is positioned between the lower shank 531 and upper flanged member 533 for the purpose of reducing gamma ray escape axially of rods 502. The flanges of member 533 are supported on the top of a tube 535 screwed to cover plate 508. Flanged member 533 is provided with an internal thread 533a by which the rod assembly can be attached to a lifting crane, for example, for installation and removal.

The neutron chain reaction may be prevented merely by immersing into the heavy water one or more rods, such as hollow rods 511 and 512 (Figs. 20 and 23), four inches in diameter, containing a $\frac{1}{16}$ inch layer of cadmium sandwiched between aluminum walls, and pivotally supported by the cover plate 508. Rod 511, for example, may be operated as a control or regulating rod, being immersed to greater or less extent in the body of heavy water, as desired. Rod 512 may be considered as a safety rod which normally is held out of contact with the body of heavy water in tank 501 and is immersed into the heavy water only for emergency purposes, that is, when control rod 511 per se is insufficient for immediate stoppage of the chain reaction. Rod 511 may be pivotally mounted and rigidly secured to a shaft 513, extending through the tank 501 through sealed bearings 540. A method of automatic control is to make rotation of shaft 513 responsive to the neutron density at a peripheral portion of reflector 504, for example, as indicated by ionization chambers such as chamber 541 having suitable amplifiers (not shown) so as to be effective to control the neutron density of the reactor and keep it substantially constant. When manual control is used the response of ionization chamber 541 is used to monitor reactor power when operating.

In utilizing the output of the reactor, well 509b plays an important role. It extends through the center of the reactor where the highest neutron density exists, and intense neutron bombardment of materials inserted into this well will take place, even at reltaively low reactor powers.

The reactor just described has been operated continuously at 250 kilowatts when filled to higher levels and properly shimmed by a shim rod 550 to compensate for operational poisoning.

*Miscellaneous*

In the embodiment of the invention disclosed herein as the preferred form, the cooling water is circulated over the outside surface of the uranium rods 22. Thus, there is a film of water between each uranium rod 22 and the walls of the aluminum tube 40. It is therefore necessary for neutrons passing from the heavy water moderator to the uranium rods 22 to pass through this film of light water. As previously mentioned, light water has a high absorption for thermal neutrons and therefore some of the thermal neutrons leaving the moderator are parasitically absorbed in the light water before they have an opportunity to enter the uranium rods 22 to produce fissions. This is not true if the coolant passes through the axis of the uranium only, so as to cool the uranium internally.

Another consideration in an external cooling system of the type disclosed herein where the coolant is passed externally over the uranium bodies 22 is that neutrons must pass through two layers of aluminum or other protective coating before entering the uranium. Some thermal neutrons are parasitically absorbed in the aluminum and therefore are lost to the chain reaction. This is another consideration effecting the reproduction ratio of a chain reacting system.

In this description, reference has been made primarily to light water as the coolant for the system. As previously mentioned, diphenyl, also known as biphenyl or phenylbenzine, is also a satisfactory liquid coolant. This substance has the chemical formula $C_6H_5C_6H_5$ and is in the form of a solid at atmospheric temperature, melts at 70° C. and has a boiling point of 225° C. Thus, a system employing diphenyl as the coolant must be operated at a temperature such that the coolant at all times maintains a temperature above 70° C. The upper temperature at which this coolant can be maintained is, of course, limited primarily by the boiling point of the heavy water moderator.

Diphenyl has a lower absorbing characteristic for thermal neutrons than has light water; for example, a loss of neutrons by absorption due to a diphenyl cooling layer 4 millimeters corresponds to the loss due to a 2.2 millimeter layer of light water. Thus, for the same reproduction ratio almost twice as much diphenyl as light water can be circulated through the reactor. The cooling passages then for a system employing diphenyl can be almost twice as wide as those for light water in systems having the same reproduction ratio, and greater power can therefor be removed. About 10 per cent to 15 per cent more pumping power is required to circulate the diphenyl due to its greater viscosity and since diphenyl solidifies at 70° C., special measures are taken to prevent solidification of the coolant while it is disposed in the portion of the cooling circuit outside of the reactor. This, of course, can be accomplished by merely maintaining the temperature of diphenyl at all times safely above 70° C. by regulating the amount of heat extracted from the diphenyl. Since the permissible temperature rise of diphenyl is necessarily limited to the comparatively narrow range between the solidification temperature of diphenyl and the boiling point of heavy water, it may be desirable to place the heavy water under a relatively high pressure so as to raise the boiling point of heavy water and hence the upper limit of the permissible operating temperature range.

During the operation of the neutronic reactor particularly at high neutron densities radioactive elements of exceedingly high capture cross section may be formed in the uranium as an intermediate element in the decay chains of fission fragments and this formation will lower the value of the reproduction factor for the system. Radioactive xenon 135 is an example of such an intermediate element, this product having a half life of about 9 hours and being formed mostly from radioactive iodine which has a half life of about 6.6 hours and decays to barium. There should be sufficient excess in the reproduction ratio of the reactor so that in the event the reproduction factor is reduced as a result of the formation of an intermediate decay element having a high capture cross section for neutrons the control rods may be withdrawn sufficiently to maintain the reproduction ratio at a value of unity while maintaining the power output at the desired level. It might be desirable to initially construct the reactor sufficiently over-sized to supply this excess reproduction ratio when needed and in this event removable impurities for example in the form of additional shim or control rods may be initially placed in the reactor and kept there at all times until the reproduction ratio commences to fall as the result of the formation of these intermediate decay elements.

Although heavy water has been mentioned throughout this description as the deuterium compound employed for the moderator, it is recognized that other compounds of deuterium will also be satisfactory, and for example, as deutero carbons such as deutero diphenyl and deutero benzene.

Throughout this description natural uranium with its $U^{235}$ content has been mentioned as a source of the fissionable isotope but it is recognized that there are other fissionable isotopes that will serve equally well, such as $U^{233}$ and $94^{239}$.

What is claimed is:

1. In a neutronic system, a reactor tank in the form of a horizontally disposed tank, an active portion including a liquid neutron moderator in the tank, a moderator leakage chamber adjacent to an end of the tank, a second chamber adjacent to the leakage chamber, tubes in the tank passing through the moderator and said tank end wall and through both chambers, a gas in the second chamber under pressure greater than the moderator in the leakage chamber, and means for withdrawing moderator from the leakage chamber.

2. In a neutronic system, a reactor including an active portion, a plurality of tubes in the active portion and projecting through one side of said portion, a fluid neutron moderator in the active portion said tubes passing through said moderator, a leakage chamber adjacent to the active portion on the tube projecting side and adapted to receive liquid moderator leaking from the active portion past the tubes, means for withdrawing moderator from the leakage chamber, and means for preventing the loss of moderator from the leakage chamber including a supply of gas on the outside of the leakage chamber under pressure greater than that of the leakage chamber.

3. In a neutronic system, a reactor including an active portion, a plurality of tubes in the active portion projecting through one side of said portion, a fluid neutron moderator in the active portion said tubes passing through said moderator, a leakage chamber adjacent to the active portion on the tube projecting side and adapted to receive liquid moderator leaking from the active portion past the tubes, means for withdrawing moderator from the leakage chamber, and means for preventing the loss of moderator from the leakage chamber including a high pressure gas chamber, and a quantity of gas in said gas chamber under a pressure greater than that of the moderator in the leakage chamber.

4. A neutronic system submerged in light water and including a reactor comprising a reactor tank, a fluid neutron moderator in the tank, a plurality of tubes projecting through a tank wall and through the moderator, a moderator leakage chamber adjacent to said tank wall and adapted to receive moderator leaking past the tubes, a high pressure chamber adjacent to the leakage chamber, a light water leakage chamber adjacent to the high pressure chamber, and a quantity of fluid in the high pressure chamber under a pressure greater than that in either of the other chambers.

5. A neutronic system submerged in light water and including a reactor comprising a reactor tank, a moderator leakage chamber, a high pressure chamber, and a water leakage chamber, the tank and all chambers being disposed in tandem, a quantity of fluid neutron moderator in the reactor tank, a quantity of fluid in the high pressure chamber under a pressure greater than that in either of the other chambers, and a plurality of tubes in the tank projecting through the moderator the tank and the chambers and opening into the water surrounding the system, the moderator leakage chamber being adapted to receive moderator leaking from the reactor tank past the tubes, and the water leakage chamber being adapted to receive light water leaking past the tubes projecting into the water.

6. A neutronic system including a reactor comprising a reactor tank, a moderator leakage chamber, a high pressure chamber, and a water leakage chamber, the tank and all chambers being disposed in tandem in the order named, a quantity of fluid neutron moderator in the reactor tank, a plurality of tubes in the reactor tank projecting through the moderator the tank and the chambers, the moderator leakage chamber being adapted to receive moderator leaking from the reactor tank past the tubes, a body of water disposed outside the water leakage chamber and submerging the tubes projecting from water leakage chamber, the water leakage chamber being adapted to receive water leaking past the tubes, and a quantity of fluid in the high pressure chamber under a pressure greater than that in either of the other chambers.

7. An apparatus for use in a neutronic system comprising a reactor tank having therein a reactor active portion, a moderator leakage chamber, a high pressure chamber, a water leakage chamber, the tank and all chambers being disposed in tandem, and a plurality of tubes projecting through the tank and the chambers, said high pressure chamber having fluid inlet means, the moderator leakage chamber being adapted to receive liquid neutron moderator leaking from the tank past the tubes, and the water leakage chamber being adapted to receive fluid leaking past the tubes projecting through the wall of the chamber opposite the reactor tank.

References Cited in the file of this patent

UNITED STATES PATENTS

| | | |
|---|---|---|
| 2,206,634 | Fermi et al. | July 2, 1940 |

FOREIGN PATENTS

| | | |
|---|---|---|
| 114,150 | Australia | May 2, 1940 |
| 114,151 | Australia | May 3, 1940 |
| 861,390 | France | Oct. 28, 1940 |
| 233,011 | Switzerland | Oct. 2, 1944 |

OTHER REFERENCES

Nature (May 13, 1939), page 793.
Naturwissenschaften, vol. 27 (1939), pages 402–410.
Business Week (Sept. 1, 1945), pages 57–64.
Goodman: "The Science & Engineering of Nuclear Power," vol. 1, pages 275, 387–501, Addison-Wesley Press, Inc. (1947).
Kelly et al.: Phy. Rev. 73, 1135–9 (1948).